(12) United States Patent
Kopelman et al.

(10) Patent No.: US 12,226,280 B2
(45) Date of Patent: Feb. 18, 2025

(54) DIRECT FABRICATION OF ORTHODONTIC APPLIANCES WITH 4D PRINTING

(71) Applicant: ALIGN TECHNOLOGY, INC., San Jose, CA (US)

(72) Inventors: Avi Kopelman, Palo Alto, CA (US); Chunhua Li, Cupertino, CA (US); Michael Christopher Cole, Longmont, CO (US); Blaine Carter, San Jose, CA (US); Matthew Durban, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 138 days.

(21) Appl. No.: 17/248,355

(22) Filed: Jan. 21, 2021

(65) Prior Publication Data
US 2021/0220087 A1   Jul. 22, 2021

Related U.S. Application Data

(60) Provisional application No. 62/964,001, filed on Jan. 21, 2020.

(51) Int. Cl.
| | |
|---|---|
| *A61C 7/08* | (2006.01) |
| *A61C 7/16* | (2006.01) |
| *B33Y 10/00* | (2015.01) |
| *B33Y 50/02* | (2015.01) |
| *B33Y 80/00* | (2015.01) |

(52) U.S. Cl.
CPC ............... *A61C 7/08* (2013.01); *B33Y 50/02* (2014.12); *B33Y 80/00* (2014.12); *A61C 7/16* (2013.01); *B33Y 10/00* (2014.12)

(58) Field of Classification Search
CPC .... A61C 7/08; A61C 7/10; A61C 7/12; A61C 7/20; A61C 7/22; A61C 7/36; A61C 5/007
See application file for complete search history.

(56) References Cited

U.S. PATENT DOCUMENTS

| | | | | |
|---|---|---|---|---|
| 4,526,540 | A | * | 7/1985 | Dellinger ............... A61C 7/146 433/24 |
| 4,793,803 | A | * | 12/1988 | Martz ...................... A61C 7/08 433/6 |
| 5,328,362 | A | * | 7/1994 | Watson .................... A61C 7/08 523/120 |

(Continued)

FOREIGN PATENT DOCUMENTS

| | | | | |
|---|---|---|---|---|
| WO | WO-2016193424 | A1 * | 12/2016 | ............. A61C 7/002 |
| WO | WO-2023278894 | A1 * | 1/2023 | |

*Primary Examiner* — Heidi M Eide
*Assistant Examiner* — Lina Faraj
(74) *Attorney, Agent, or Firm* — FisherBroyles, LLP

(57) ABSTRACT

An appliance comprises a passive component and an active force generating component, in which the active force generating component is configured to react to a stimulus and generate tooth movement forces. In some embodiments, the passive component is configured to deflect when placed on one or more teeth and generate tooth movement forces, which are combined with tooth movement forces of the force generating component. In some embodiments, the passive component comprises a polymer which is less reactive to the stimulus than the force generating component. The force generating component can be configured to increase force to one or more teeth at an appropriate time.

18 Claims, 13 Drawing Sheets

(56) References Cited

U.S. PATENT DOCUMENTS

| | | | |
|---|---|---|---|
| 5,820,368 A | 10/1998 | Wolk | |
| 5,975,893 A | 11/1999 | Chishti et al. | |
| 6,183,248 B1 | 2/2001 | Chishti et al. | |
| 6,309,215 B1 | 10/2001 | Phan et al. | |
| 6,386,864 B1 | 5/2002 | Kuo | |
| 6,390,812 B1* | 5/2002 | Chishti | A61C 7/00 433/24 |
| 6,450,807 B1 | 9/2002 | Chishti et al. | |
| 6,454,565 B2 | 9/2002 | Phan et al. | |
| 6,471,511 B1 | 10/2002 | Chishti et al. | |
| 6,524,101 B1 | 2/2003 | Phan et al. | |
| 6,572,372 B1 | 6/2003 | Phan et al. | |
| 6,607,382 B1 | 8/2003 | Kuo et al. | |
| 6,705,863 B2 | 3/2004 | Phan et al. | |
| 6,749,414 B1 | 6/2004 | Hanson et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 7,074,039 B2 | 7/2006 | Kopelman et al. | |
| 7,104,792 B2 | 9/2006 | Taub et al. | |
| 7,121,825 B2 | 10/2006 | Chishti et al. | |
| 7,160,107 B2 | 1/2007 | Kopelman et al. | |
| 7,192,273 B2 | 3/2007 | McSurdy, Jr. | |
| 7,234,936 B2* | 6/2007 | Lai | A61C 7/08 433/20 |
| 7,347,688 B2 | 3/2008 | Kopelman et al. | |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,553,157 B2 | 6/2009 | Abolfathi et al. | |
| 7,600,999 B2 | 10/2009 | Knopp | |
| 7,658,610 B2 | 2/2010 | Knopp | |
| 7,766,658 B2 | 8/2010 | Tricca et al. | |
| 7,771,195 B2 | 8/2010 | Knopp et al. | |
| 7,854,609 B2 | 12/2010 | Chen et al. | |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,892,474 B2 | 2/2011 | Shkolnik et al. | |
| 7,914,283 B2 | 3/2011 | Kuo | |
| 7,947,508 B2 | 5/2011 | Tricca et al. | |
| 8,152,518 B2 | 4/2012 | Kuo | |
| 8,172,569 B2 | 5/2012 | Matty et al. | |
| 8,235,715 B2 | 8/2012 | Kuo | |
| 8,292,617 B2 | 10/2012 | Brandt et al. | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,641,414 B2 | 2/2014 | Borovinskih et al. | |
| 8,684,729 B2 | 4/2014 | Wen | |
| 8,708,697 B2 | 4/2014 | Li et al. | |
| 8,758,009 B2 | 6/2014 | Chen et al. | |
| 8,771,149 B2 | 7/2014 | Rahman et al. | |
| 8,899,976 B2* | 12/2014 | Chen | A61C 7/00 433/6 |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 | 5/2015 | Kuo et al. | |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,299,894 B2 | 5/2019 | Tanugula et al. | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,813,720 B2 | 10/2020 | Grove et al. | |
| 10,874,483 B2 | 12/2020 | Boronkay | |
| 10,881,487 B2 | 1/2021 | Cam et al. | |
| 10,912,629 B2 | 2/2021 | Tanugula et al. | |
| 10,959,810 B2 | 3/2021 | Li et al. | |
| 10,993,783 B2 | 5/2021 | Wu et al. | |
| 2002/0192617 A1 | 12/2002 | Phan et al. | |
| 2004/0166462 A1 | 8/2004 | Phan et al. | |
| 2004/0166463 A1 | 8/2004 | Wen et al. | |
| 2005/0014105 A1 | 1/2005 | Abolfathi et al. | |
| 2005/0186524 A1 | 8/2005 | Abolfathi et al. | |
| 2005/0244768 A1 | 11/2005 | Taub et al. | |
| 2006/0019218 A1 | 1/2006 | Kuo | |
| 2006/0078841 A1 | 4/2006 | Desimone et al. | |
| 2006/0115782 A1 | 6/2006 | Li et al. | |
| 2006/0115785 A1 | 6/2006 | Li et al. | |
| 2006/0154195 A1* | 7/2006 | Mather | F03G 7/065 433/6 |
| 2006/0199142 A1 | 9/2006 | Liu et al. | |
| 2006/0234179 A1* | 10/2006 | Wen | A61C 7/00 433/6 |
| 2007/0065768 A1* | 3/2007 | Nadav | A61C 7/08 433/18 |
| 2008/0118882 A1 | 5/2008 | Su | |
| 2008/0160473 A1 | 7/2008 | Li et al. | |
| 2008/0268400 A1 | 10/2008 | Moss et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2011/0269092 A1 | 11/2011 | Kuo et al. | |
| 2013/0323665 A1* | 12/2013 | Dinh | A61C 7/08 427/2.29 |
| 2014/0061974 A1 | 3/2014 | Tyler | |
| 2014/0067334 A1 | 3/2014 | Kuo | |
| 2014/0265034 A1 | 9/2014 | Dudley | |
| 2014/0363779 A1* | 12/2014 | Kopelman | A61C 7/08 29/896.11 |
| 2015/0079532 A1* | 3/2015 | Pechersky | A61C 7/08 433/2 |
| 2015/0097315 A1 | 4/2015 | DeSimone et al. | |
| 2015/0097316 A1 | 4/2015 | DeSimone et al. | |
| 2015/0102532 A1 | 4/2015 | DeSimone et al. | |
| 2015/0158244 A1 | 6/2015 | Tibbits et al. | |
| 2015/0265376 A1* | 9/2015 | Kopelman | A61C 7/08 264/16 |
| 2015/0366637 A1 | 12/2015 | Kopelman et al. | |
| 2015/0366638 A1 | 12/2015 | Kopelman et al. | |
| 2016/0157962 A1* | 6/2016 | Kim | B29C 65/48 156/242 |
| 2016/0193014 A1 | 7/2016 | Morton et al. | |
| 2016/0242870 A1 | 8/2016 | Matov et al. | |
| 2016/0242871 A1 | 8/2016 | Morton et al. | |

(56) References Cited

U.S. PATENT DOCUMENTS

| | | |
|---|---|---|
| 2016/0256240 A1* | 9/2016 | Shivapuja .......... A61C 13/0013 |
| 2016/0310236 A1* | 10/2016 | Kopelman ............... A61C 7/14 |
| 2017/0007359 A1 | 1/2017 | Kopelman et al. |
| 2017/0007360 A1 | 1/2017 | Kopelman et al. |
| 2017/0007361 A1* | 1/2017 | Boronkay ............. A61C 7/002 |
| 2017/0007365 A1 | 1/2017 | Kopelman et al. |
| 2017/0007366 A1 | 1/2017 | Kopelman et al. |
| 2017/0007386 A1 | 1/2017 | Mason et al. |
| 2017/0008333 A1* | 1/2017 | Mason .................... A61C 7/08 |
| 2017/0065372 A1* | 3/2017 | Mah ..................... A61N 5/0601 |
| 2017/0065373 A1* | 3/2017 | Martz ................... A61C 7/002 |
| 2017/0135792 A1 | 5/2017 | Webber |
| 2017/0135793 A1 | 5/2017 | Webber et al. |
| 2017/0165032 A1 | 6/2017 | Webber et al. |
| 2017/0319296 A1 | 11/2017 | Webber et al. |
| 2018/0021107 A1* | 1/2018 | Benarouch ............ A61C 7/002 433/6 |
| 2018/0153648 A1 | 6/2018 | Shanjani et al. |
| 2018/0153733 A1 | 6/2018 | Kuo |
| 2018/0168776 A1 | 6/2018 | Webber |
| 2018/0353264 A1 | 12/2018 | Riley et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2019/0388189 A1* | 12/2019 | Shivapuja .............. A61C 7/002 |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0170757 A1* | 6/2020 | Kopelman .............. G06F 30/00 |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0261185 A1* | 8/2020 | Hunter ................. A61C 9/0053 |
| 2020/0316856 A1* | 10/2020 | Mojdeh ................... B29C 71/04 |
| 2020/0390523 A1 | 12/2020 | Sato et al. |
| 2021/0078357 A1 | 3/2021 | Venkatasanthanam et al. |

* cited by examiner

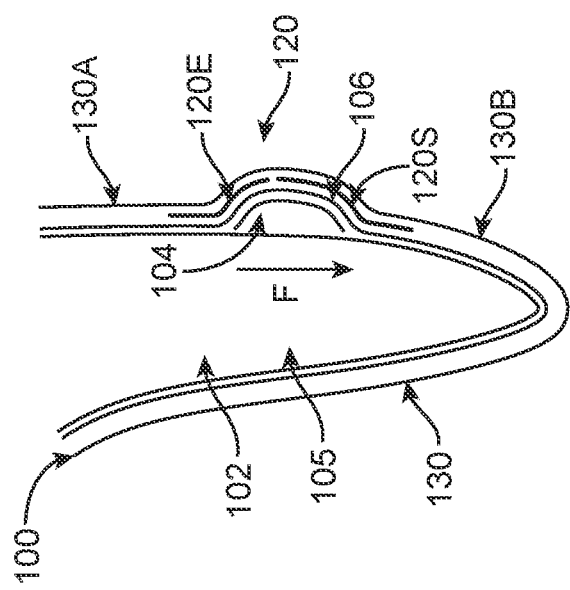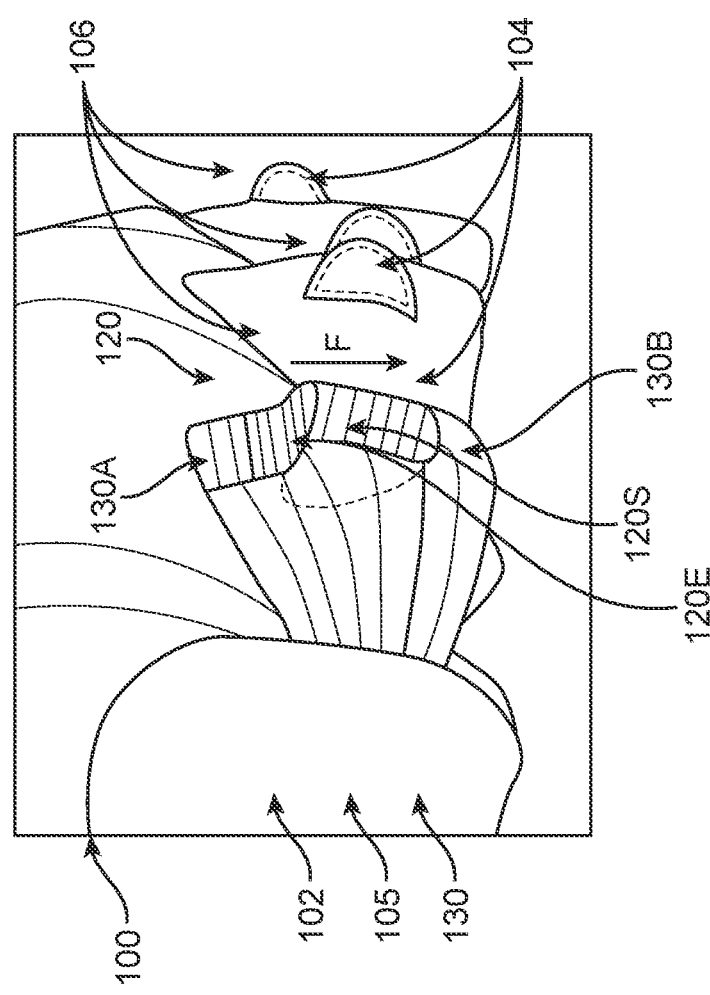

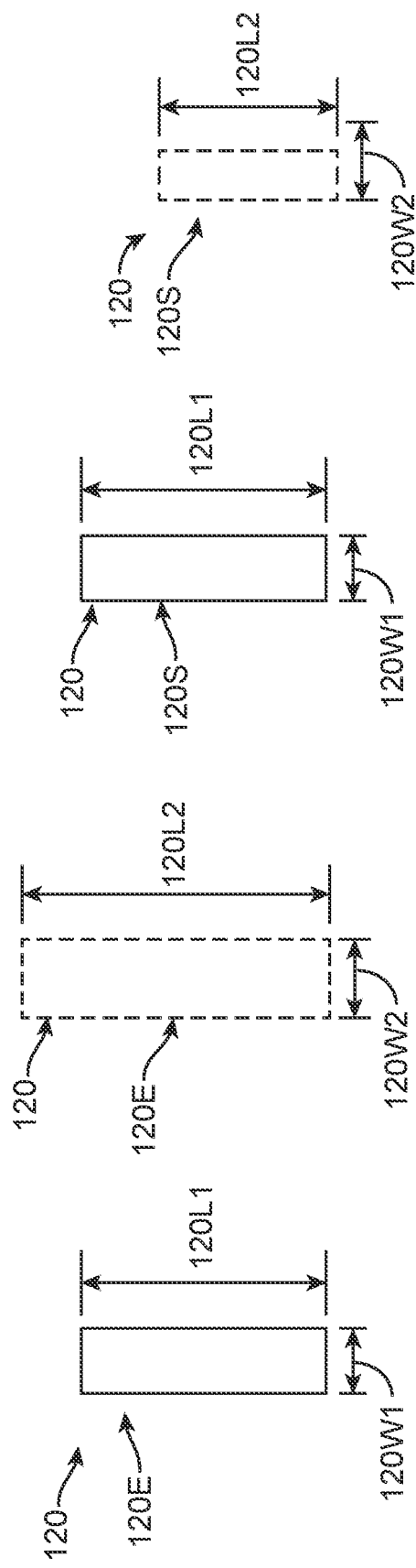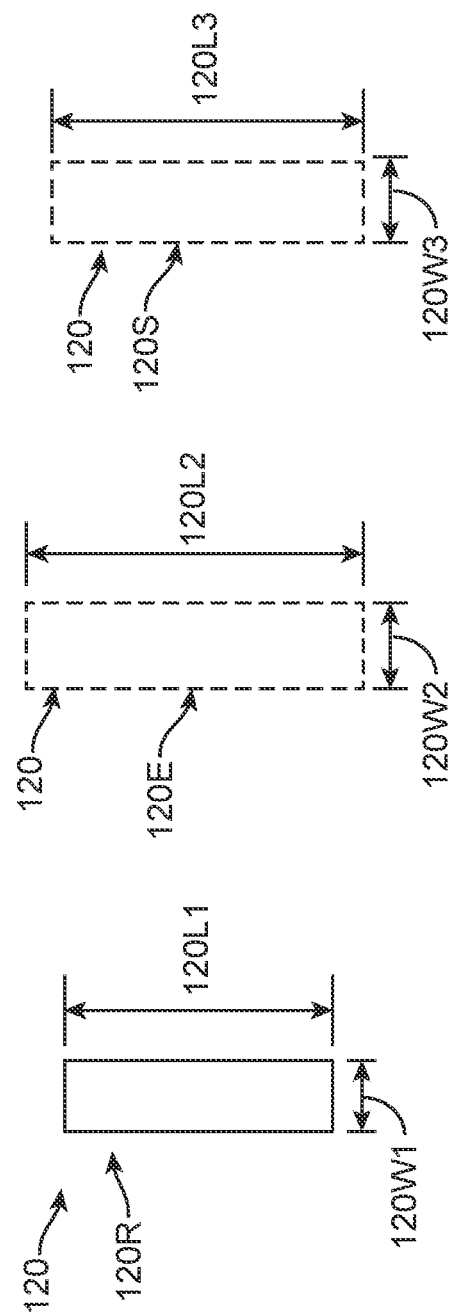

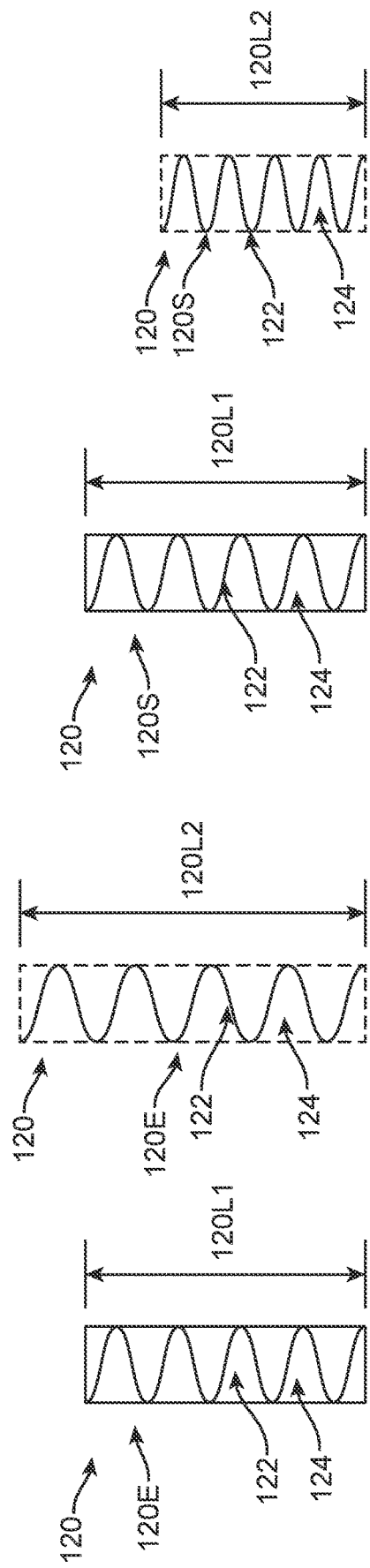

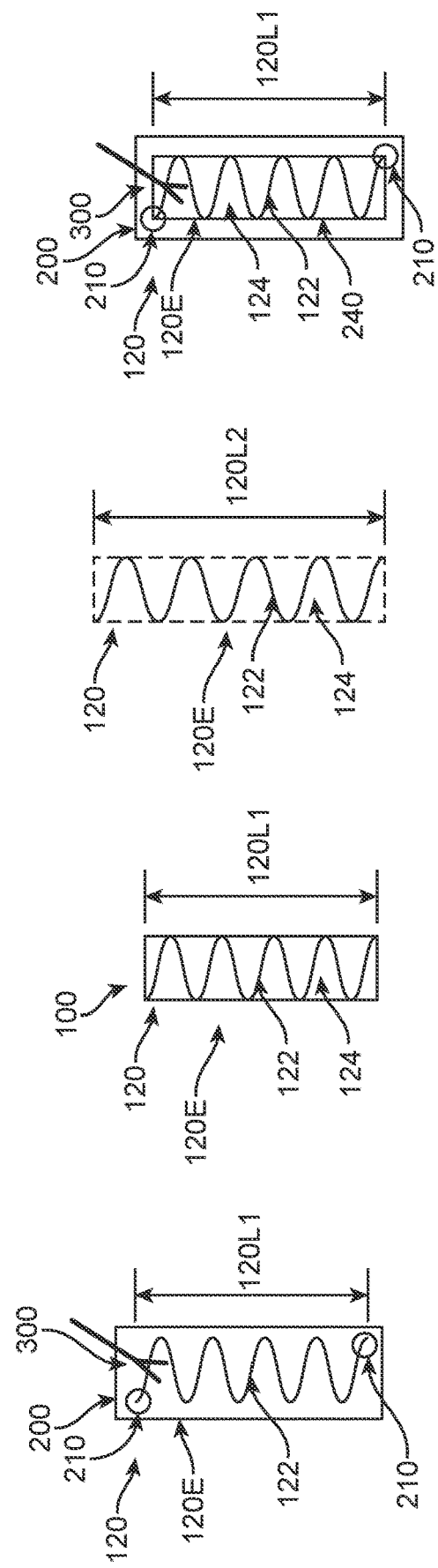

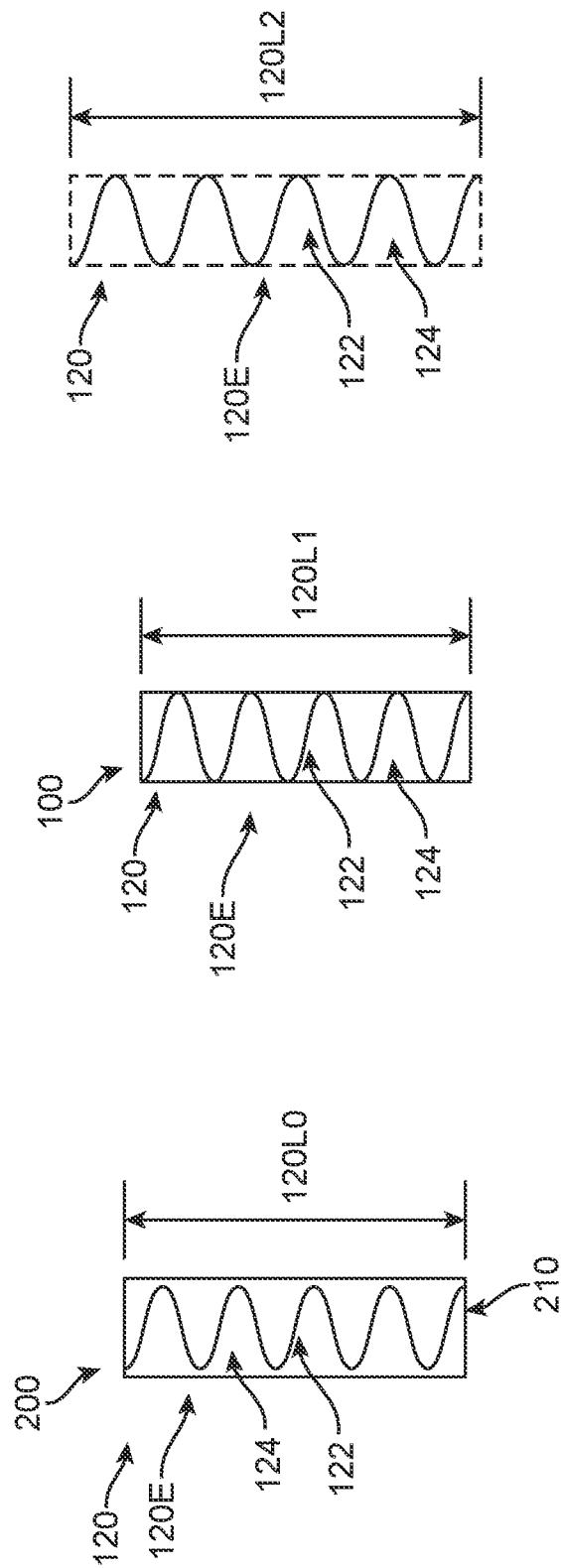

DIRECT FABRICATION OF ORTHODONTIC APPLIANCES WITH 4D PRINTING

RELATED APPLICATIONS

This application claims the benefit under 35 U.S.C. § 119(e) of U.S. Provisional Patent Application No. 62/964,001, filed Jan. 21, 2020, and titled "DIRECT FAB OF ORTHODONTIC APPLIANCES WITH 4D PRINTING," which is incorporated, in its entirety, by this reference.

BACKGROUND

Oral appliances can be used for many purposes such as repositioning teeth, palatal expansion, apnea, and mandibular adjustment. For example, transparent shell appliances such as aligners can be used to reposition teeth in accordance with a treatment plan, and palatal expanders can be used to expand the palate. However, prior oral appliances may not be well suited for some tooth movements and may be less comfortable than would be ideal in at least some instances. Also, some prior oral appliances may weaken somewhat as the appliance is worn and may not move teeth as effectively as would be ideal. For example, the appliance may undergo stress relaxation after being worn for a while, which can result in less force to the tooth. In some instances a patient may find the oral appliance less comfortable than satisfactory, and the patient may decide not to complete treatment. For example, some patients may feel less comfort when advancing to a new stage of treatment with a new appliance than at the immediately prior stage with the prior appliance.

The prior approaches to manufacturing appliances can be somewhat more complex and involve more manufacturing steps than would be ideal. For example, prior approaches to manufacturing oral appliances can involve manufacturing a positive mold of the patient's mouth and then thermoforming the appliance over the mold. This approach can be somewhat wasteful as the positive molds are typically not reused. Although the direct fabrication of appliances with three dimensional ("3D") additive manufacturing from computer models has been proposed, the prior approaches to additive manufacturing can be less than ideal, and may rely on materials that are less than ideally suited for the fabrication of oral appliances. For example, at least some of the 3D additive manufacturing materials may have less strength than would be ideal.

One active area of additive manufacturing research is four-dimensional ("4D") printing, in which an object is fabricated in 3D by additive manufacturing and configured to respond to a stimulus such as heat or water, which adds a temporal dimension. Work in relation to the present disclosure suggests that at least some of the prior approaches to 4D manufacturing are less than ideally suited for use with oral appliances. For example, the forces generated with at least some 4D printing approaches may not be sufficient or well suited for tooth movement. At least some of the prior oral appliances may be less than ideally suited for combination with 4D printing. Although directly fabricated dental appliances that swell have been proposed, work in relation to the present disclosure suggests that the prior approaches may have less than ideally addressed the rate of swelling and forces applied with such appliances.

In light of the above, improved oral appliances and manufacturing methods are needed that ameliorate at least some of the above limitations.

SUMMARY

The presently described methods, apparatus, and appliances ameliorate at least some of the limitations of the prior approaches. In some embodiments, an appliance comprises a passive component and an active force generating component, in which the active force generating component is configured to react to a stimulus and generate tooth movement forces. In some embodiments, the passive component is configured to deflect when placed on one or more teeth and generate tooth movement forces, which are combined with tooth movement forces of the force generating component. In some embodiments, the passive component comprises a polymer which is less reactive to the stimulus than the force generating component. The force generating component can be configured to increase force to one or more teeth at an appropriate time after the appliance has been initially placed in the mouth of the patient, such as a week or more after initial placement, which may improve patient comfort. Alternatively or in combination, the force generating component can be configured extend in order to counteract stress relaxation of the appliance, which may occur a week or more after the appliance has been initially placed in the mouth of the patient.

In some embodiments, the oral appliance comprises a force generating component configured with a push-pull configuration comprising a push component to push one or more teeth with a first force in a first direction and pull component to pull the one or more teeth with a second force in a second direction, which can provide improved control of the movement. The second direction can oppose the first direction, can be orthogonal to the first direction, or can include portions that oppose and are orthogonal to the first direction. In some embodiments, the force generating component is configured to provide tensioning to move the one or more teeth. In some embodiments, the force generating component is configured to provide a change in force over an extended time. The force generating component may comprise an attenuation component configured to weaken over time, so as to allow the amount of force applied to the tooth to increase in response to weakening of the attenuation component. In some embodiments, the attenuation component can allow the force generating component to provide a more constant force to a tooth over time, and the weakening of the force generating component can be timed to coordinate with movement of the tooth, so as to provide a more constant force to the tooth. The attenuation component can be configured to weaken over an appropriate amount of time so as to increase the amount of force with appropriate amounts at appropriate times. In some embodiments, the attention component comprises one or more of an erodible material, a dissolvable material, or a hydratable material configured to weaken in response to oral hydration over an appropriate amount of time.

In some embodiments, the force generating component comprises a material configured to expand at an appropriate rate in response to hydration, which can control the amount of force provided over time. In some embodiments, the appliance is configured to control a rate of diffusion of water into the material, which is related to a rate of expansion of the material and corresponding force delivered to the tooth. In some embodiments, the material comprises a water absorbing material such as hygroscopic material. In some embodiments, a passive material of the appliance is sized and shaped to control a rate of diffusion from an exterior of the appliance to the hygroscopic material within the passive material. The expansion of the material can be timed to correspond to movement of the tooth, in order to provide a more constant force to the tooth than without the timed expansion.

In some embodiments, the force generating component is configured to reversibly expand and contract in response to one or more stimuli. In some embodiments, the force generating component is configured to expand when placed in a mouth in response to warming to a temperature above a transition temperature and to shrink in response to cooling to a temperature below the transition temperature, which can facilitate removal of the appliance from the mouth. In some embodiments, the force generating component of the appliance is configured to shrink in response to the patient placing a cool liquid such as water in the mouth in order to facilitate removal of the appliance.

In some embodiments, the force generating component is fabricated in situ in the 3D additive manufacturing system with other components of the appliance. Alternatively or in combination, the force generating component comprises a component placed with an end effector coupled to a robotic arm in order to pick-up the component and place the component on an appliance that has been partially fabricated with a 3D additive manufacturing process.

In some embodiments, an apparatus is configured for a patient to treat an appliance with an agent to induce a conformational change in the molecular structure of the appliance. The apparatus may comprise a receptacle such as a container configured to receive the appliance, in order to change the force generated with the force generating component.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 2A shows an exemplary force generating component of an oral appliance comprising a push-pull configuration, in accordance with some embodiments;

FIG. 2B shows a side profile view of the force generating component of FIG. 2A;

FIGS. 7A and 7B show a force generating component configured to expand, in accordance with some embodiments;

FIGS. 7C and 7D show a force generating component configured to shrink, in accordance with some embodiments;

FIGS. 7E to 7G show a force generating component configured to extend or expand in response to a first stimulus and to retract or shrink in response to the second stimulus.

FIGS. 8A and 8B show a force generating component comprising a first component configured to extend and generate force on a tooth and a second component configured to attenuate force from the first component and to weaken in response to a stimulus;

FIGS. 8C and 8D show a force generating component comprising a first component configured to retract to generate a force on a tooth and a second component configured to attenuate force from the first component and to weaken in response a stimulus;

FIG. 9A shows placement of a force generating component on a partially fabricated appliance, in accordance with some embodiments;

FIG. 9B shows the force generating component of FIG. 9A on a fabricated appliance prior to exposure to a stimulus, in accordance with some embodiments;

FIG. 9C shows the force generating component of FIG. 9B after exposure to the stimulus, in accordance with some embodiments;

FIG. 9D shows placement of a force generating component module on a partially fabricated appliance, in accordance with some embodiments;

FIG. 10A shows a force generating component in a relaxed configuration on a partially fabricated appliance 4D prior treatment to change molecular confirmation of the force generating component, in accordance with some embodiments;

FIG. 10B shows the force generating component of FIG. 10A after treatment to produce a molecular change in confirmation of the force generating component, in accordance with some embodiments;

FIG. 10C shows the force generating component of FIG. 10B after exposure to a stimulus, in accordance with some embodiments;

DETAILED DESCRIPTION

Figure 1A:
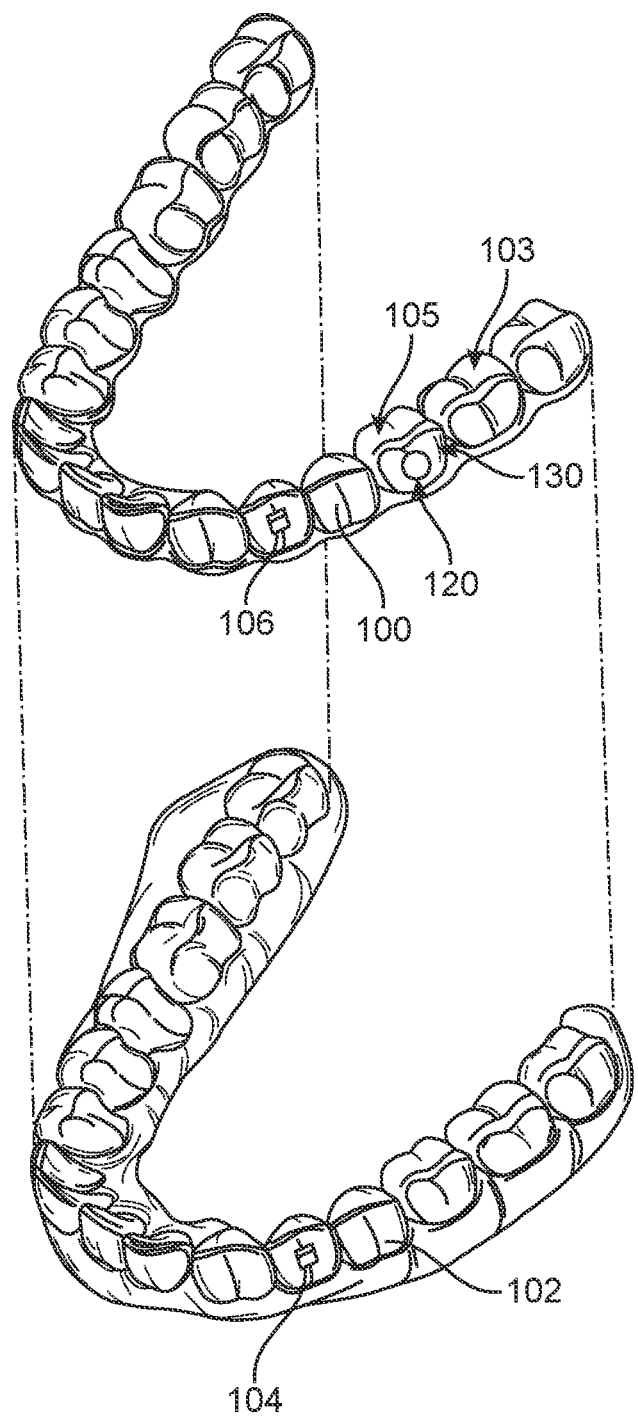
FIG. 1A illustrates an exemplary tooth repositioning appliance that can be worn by a patient in order to achieve an incremental repositioning of individual teeth 102 in the jaw, in accordance with some embodiments.

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The presently disclosed directly fabricated oral appliances and methods are well suited for combination with many prior oral appliances, such as aligners to reposition teeth, palatal expanders to expand the palate, apnea appliances, and mandibular relocation appliances.

Although reference is made to oral appliances, the presently disclosed methods and apparatuses and appliances are well suited for other applications, such as implantable devices.

In some embodiments, the appliance comprises a passive component and a force generating component. The force generating component can be configured to provide an appropriate response to a stimulus. The stimulus may comprise one or more of temperature, a body temperature, a mouth temperature, a temperature above about 20 degrees C., a temperature below about 20 degrees C., light, visible light, ultraviolet light, infrared light, a fluid, a liquid, a mouth fluid, water, moisture, a pH, osmotic strength, an ion, a chelating agent, or calcium.

The appliance can be provided to a patient in a first configuration. The appliance can be configured to change to a second configuration in response to the stimulus, so as to change shape in response to the stimulus. The appliance can be configured to apply a planned force to the tooth in accordance with a stage of treatment plan. A change in force and shape may occur over an appropriate time, such as with a time release profile.

In some embodiments, the force generating component is configured to shrink in response to a cooling stimulus. The force generating component can be configured to shrink in response to cold water, such as below about 20 degrees C., e.g. below about 10 degrees C. In some embodiments, the force generating component is configured to shrink when placed in cold water prior to placement in a mouth of the patient, to expand in response to a temperature of the mouth above about 30 degrees C., and to shrink when a cold liquid such as water is placed in the mouth to facilitate removal.

The force generating component can be configured to respond to the stimulus over an appropriate amount of time. In some embodiments, the force generating component is configured to change its length so as to increase a force applied to a tooth over an appropriate amount of time. In some embodiments, the force generating component is configured to incrementally increase an amount of force applied to the tooth over an appropriate amount of time, such as one to four weeks. In some embodiments, the force generating component is configured to incrementally increase the force over a plurality of days. In some embodiments, the force generating component is configured to increase the force by a first amount the first day after being placed in the mouth and by a second amount one week after being placed in the mouth, in which the second amount comprises an increase greater than the first amount. In some embodiments, the force generating component is configured to increase force in accordance with force generation profile, in which the force increases incrementally over two to four weeks. In some embodiments, the amount of force applied to the one or more teeth at two weeks from the force generating component is greater than the amount of force at one week, for example by a factor at least about 1.25. In some embodiments, the amount of force from the force generating component at four weeks is greater than the amount of force at two weeks, for example by a factor of at least 1.25.

Work in relation to the present disclosure indicates that an oral appliance may undergo a stress relaxation, in which one or more passive components of the device become less stiff and provide less force on the one or more teeth. The force generating component can be configured to increase its length at a corresponding rate so as to counteract the stress-relaxation. For example, the stress relaxation of the passive component of the appliance may occur over a course of about one to four weeks, and the force generating component can be configured to increase in length by an appropriate corresponding distance within a range from about 0.2 mm to about 1 mm over the one to four weeks.

As used herein the terms "dental appliance," "orthodontic appliance," and "tooth receiving appliance" are treated interchangeably.

As used herein the term "and/or" is used as a functional term to indicate that two words or expressions are to be taken together or individually. For example, A and/or B encompasses A alone, B alone, and A and B together.

As used herein the terms "torque" and "moment" are treated synonymously.

As used herein a "moment" encompasses a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as tooth, for example. Any discussion herein referring to application of forces on a patient's teeth is equally applicable to application of moments on the teeth, and vice-versa.

As used herein a "plurality of teeth" encompasses two or more teeth. In some embodiments, one or more posterior teeth comprises one or more of a molar, a premolar or a canine, and one or more anterior teeth comprising one or more of a central incisor, a lateral incisor, a cuspid, a first bicuspid or a second bicuspid.

The present disclosure provides orthodontic systems and related methods for designing and providing improved or more effective tooth moving systems for eliciting a desired tooth movement and/or repositioning teeth into a desired arrangement.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or known commercially available tooth moving components such as attachments and polymeric shell appliances. In some embodiments, the appliance and one or more attachments are configured to move one or more teeth along a tooth movement vector comprising six degrees of freedom, in which three degrees of freedom are rotational and three degrees of freedom are translation.

The present disclosure provides orthodontic appliances and related systems, methods, and devices. Repositioning of teeth may be accomplished with the use of a series of removable elastic positioning appliances such as the Invisalign® system available from Align Technology, Inc., the assignee of the present disclosure. Such appliances may have a thin shell of elastic material that generally conforms to a patient's teeth but is slightly out of alignment with an initial or immediately prior tooth configuration. Placement of the appliance over the teeth applies controlled forces in specific locations to gradually move the teeth into the new configuration. Repetition of this process with successive appliances comprising new configurations eventually moves the teeth through a series of intermediate configurations or alignment patterns to a final desired configuration.

The force generating components disclosed herein can generate forces based on a target tooth displacement or orientation. For example, an amount of tooth displacement can be selected, and the force generating component can be fabricated such that a tooth displacement force is generated when the appliance is worn, so long as the amount of tooth displacement is less than the target tooth displacement. Thus, an appliance can generate tooth displacement forces without causing excessive tooth displacement. In some cases, the target tooth displacement can be adjustable; for example, adjustable screws, springs, bands, or other components can be adjusted to change the size of the aligner, thereby changing the target tooth displacement. An adjustable aligner can be used to generate a slow tooth displacement, for example.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

FIG. 1A illustrates an exemplary tooth repositioning appliance 100, such as an aligner, that can be worn by a patient in order to achieve an incremental repositioning of individual teeth 102 in the jaw. The appliance can include a shell (e.g., a continuous polymeric shell or a segmented shell) having teeth one or more engaging structures 103, which may comprise one or more teeth-receiving cavities 105 that receive and resiliently reposition the teeth 102. An appliance or portion(s) thereof may be indirectly fabricated using a physical model of teeth. For example, an appliance (e.g., polymeric appliance) can be formed using a physical model of teeth and a sheet of suitable layers of polymeric material may be thermoformed over the physical model of teeth. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring attachments 104 on teeth 102. In such embodiments, the appliance 100 may comprise one or more corresponding receptacles 106 such as pockets or apertures sized and shaped to receive the attachment 104 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

In some embodiments, the appliance 100 may comprises a force generating component 120 configured to generate force in response to a stimulus. The force generating component can be coupled to a passive component. The force generating component 120 may comprise an active material configured to generate a force in response to the stimulus. The force generating component can be coupled to a passive component 130, which comprises a passive material that is less reactive to the stimulus than an active material of the force generating component. The passive material 130 may comprise a material configured to deflect elastically in response to mechanical forces when placed on the teeth, so as to generate tooth movement forces similar to an aligner, such as an Invisalign® aligner. The tooth movement forces of the passive component can be combined with tooth movement forces of the force generating component 120, in order to move one or more teeth of the patient. In some embodiments, the passive component is substantially non-reactive to the stimulus. The passive component 130 may comprise a portion of the appliance 100, and in some embodiments, most of the appliance 100 comprises a similar material to the passive component. The passive component may comprise a portion of appliance 100 configured to couple to the force generating component to the one or more teeth in order to stabilize the force generating component in order to appropriately direct the forces from the force generating component toward the one or more teeth. In some embodiments, the passive component 130 comprises a material configured to flex and provide forces to the teeth and to retain the appliance.

Figure 1B:
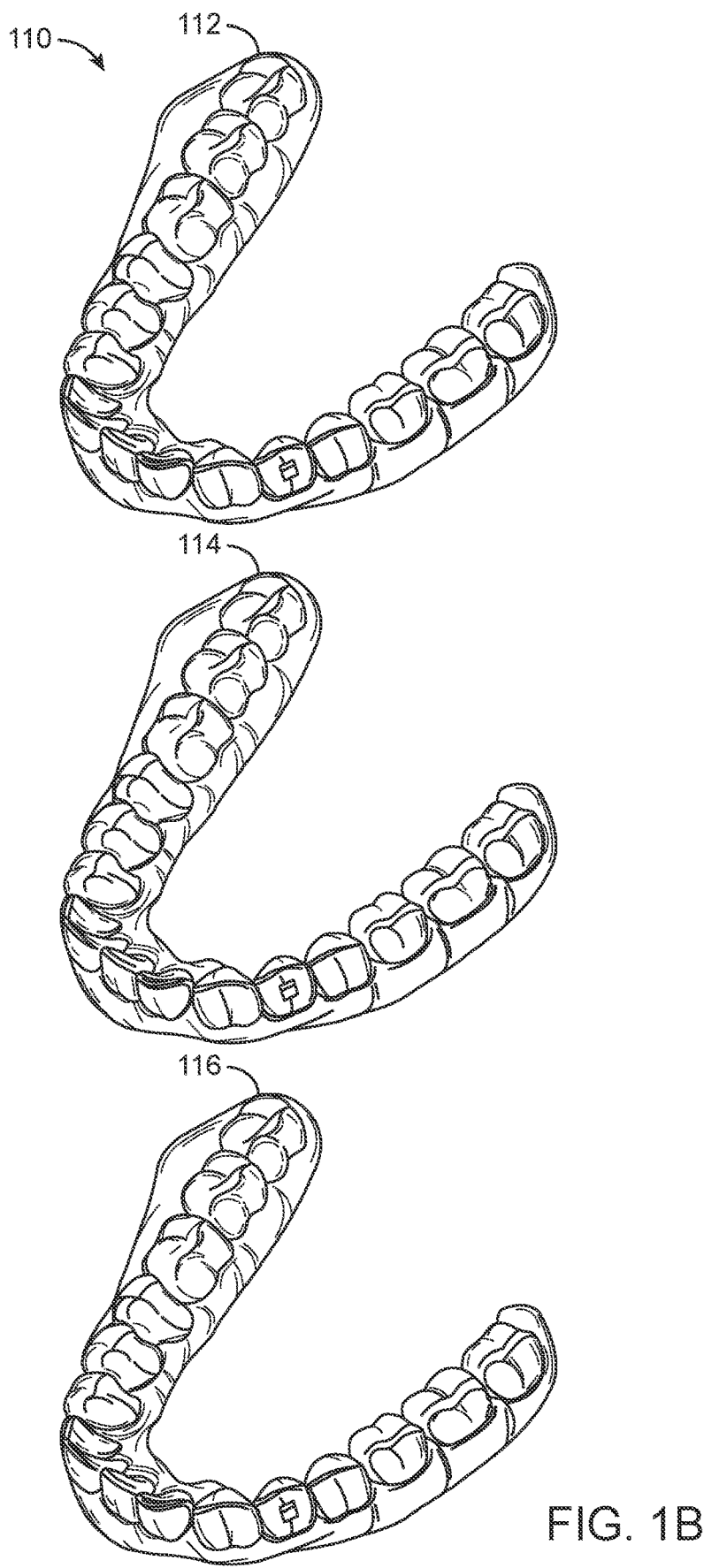
FIG. 1B illustrates a tooth repositioning system 110 including a plurality of oral appliances, in accordance with some embodiments.

FIG. 1B illustrates a tooth repositioning system 110 including a plurality of appliances 112, 114, 116, one or more of which may comprise the force generating component 120 and the passive component 130 as described herein. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIGS. 2A and 2B show an exemplary force generating component 120 of an oral appliance such as an aligner comprising a push-pull configuration. The force generating component 120 comprises a first component 120E configured to one or more expand or extend in response to the stimulus as described herein, so as to generate a push force against the tooth. The force generating component 120 comprises a second component 120S configured to shrink or retract in response to the stimulus as described herein, so as to generate tension with a pulling force on the tooth. The amount of force F generated with the force generating component 130 may comprise a combination of a first pushing force from the first component 120E and a second pulling force from the second component 120S. The passive component 130 can extend around the force generating component and may comprise a first portion 130A coupled to first component 120E and a second portion 130B coupled to second component 120S. The passive component 130 may comprise sufficient stiffness between first portion 130A and second portion 130B such that the distance between these components remains substantially fixed when forces are applied to the tooth.

In some embodiments, the first component 120E and the second component 120S are arranged to engage one or more an attachments 104 on the one or more teeth 102. The one or more attachments 104 can be received in one or more receptacles 106 and the force generating component 120E configured to generate a force on the attachment received in the one or more receptacles 106. The first component 120E can be configured to engage a first side of attachment 104 with a pushing force and the second component 120S can be configured to engage the attachment 104 with a pulling force. Optionally, additional attachments 104 and receptacles 106 can be configured to retain the appliance on the teeth when the force is generated in response to the stimulus.

The force generating component 120 can be configured in many ways. The force generating component 120 can be configured to one or more of extrude, intrude, translate or rotate the tooth. In some embodiments, a plurality of attachments is placed on the tooth, each configured with a push-pull configuration.

In some embodiments, one or more additional attachments 104 are placed on one or more neighboring teeth, e.g. adjacent teeth, in order more effectively couple the appliance 100 to the one or more teeth 102 to be moved. For example, the one or more attachments 104 may comprise a first attachment on a first tooth, a second attachment on a second tooth, and a third attachment on a third tooth, in which the second tooth is between the first tooth and the second tooth.

FIG. 2B shows a side profile view of the force generating component 120 of FIG. 2A. In some embodiments, the first component 120E is located on appliance 100 so as to engage a first portion of attachment 104 located within receptacle 106. The second component 120S can be located on appliance 120 so as to engage a second portion of attachment 104. The first component 102E may be coupled directly to the second component 102S, for example with contact between the two components. Alternatively, there may be a gap between the first component and the second component. In some embodiments, one or more layers of passive material extends over the first component or the second component. For example, a first portion 130A of the passive component 130 may extend over the first component 120E so as to direct force F toward second component 120S. Alternatively or in combination, a second portion 130B of the passive component 130 may extend over the second component 120S so as to drawn the attachment toward second component 120S.

Although reference is made to a push-pull configuration in the context of an attachment, the push-pull configuration can be used to engage and move one or more teeth without an attachment, for example.

Although FIGS. 2A and 2B make reference to a push-pull configuration, in some embodiments, the second component 102S comprises a component configured to weaken as described herein. For example, the component 102S may comprise a component configured to shrink or weaken so as to allow the attachment to move toward component 102S in response to forces from push component 102E. This approach can provide a better fit of the attachment in the receptacle rather than leaving clearance for the attachment to move in the receptacle, for example. A similar approach can be used with respect to tooth movements without an attachment, for example.

Figure 3B:
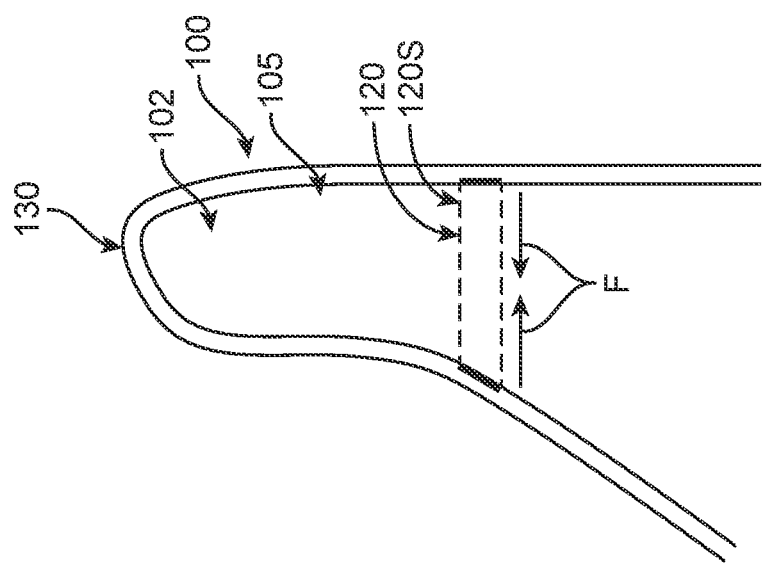
FIG. 3B shows a side profile view of the force generating component of FIG. 3A.
Figure 3A:
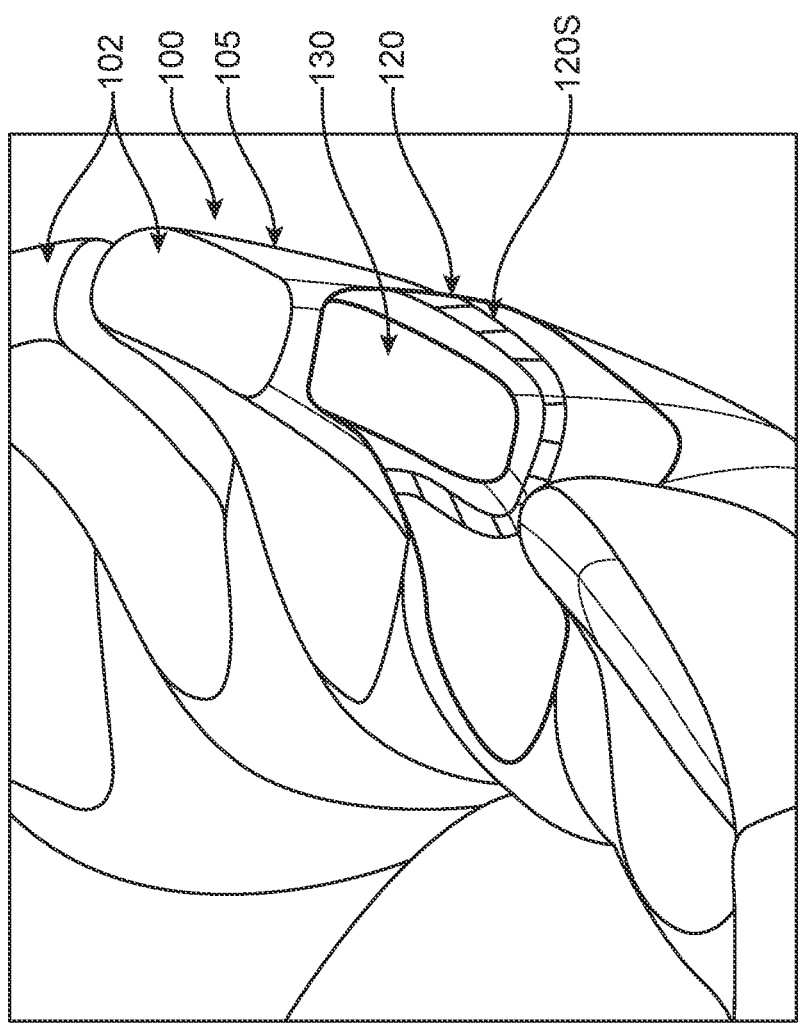
FIG. 3A shows an exemplary force generating component of an oral appliance, in which the force generating component is configured to shrink in order to generate a force on a tooth, in accordance with some embodiments.

FIG. 3A shows an exemplary force generating component 120 of an oral appliance 100 such as an aligner, in which the force generating component is configured to shrink in response to a stimulus. FIG. 3B shows a side profile view of the force generating component of FIG. 3A. The force generating component 120 may comprise a shrinking component 120S, in which dimensions of the shrinking component are configured to decrease in response to the stimulus as described herein. In some embodiments, the shrinking component 120S extends substantially circumferentially around the tooth and is configured to shrink and generate tension in order to generate a force on the tooth. In some embodiments, the tooth comprises an inclined surface and the shrinkage of the component 120S develops tension around the tooth that generates a force related to the angle of inclination of the tooth. For example, tensioning the component 120S may generate a force directed to as to intrude the tooth.

Figure 4:
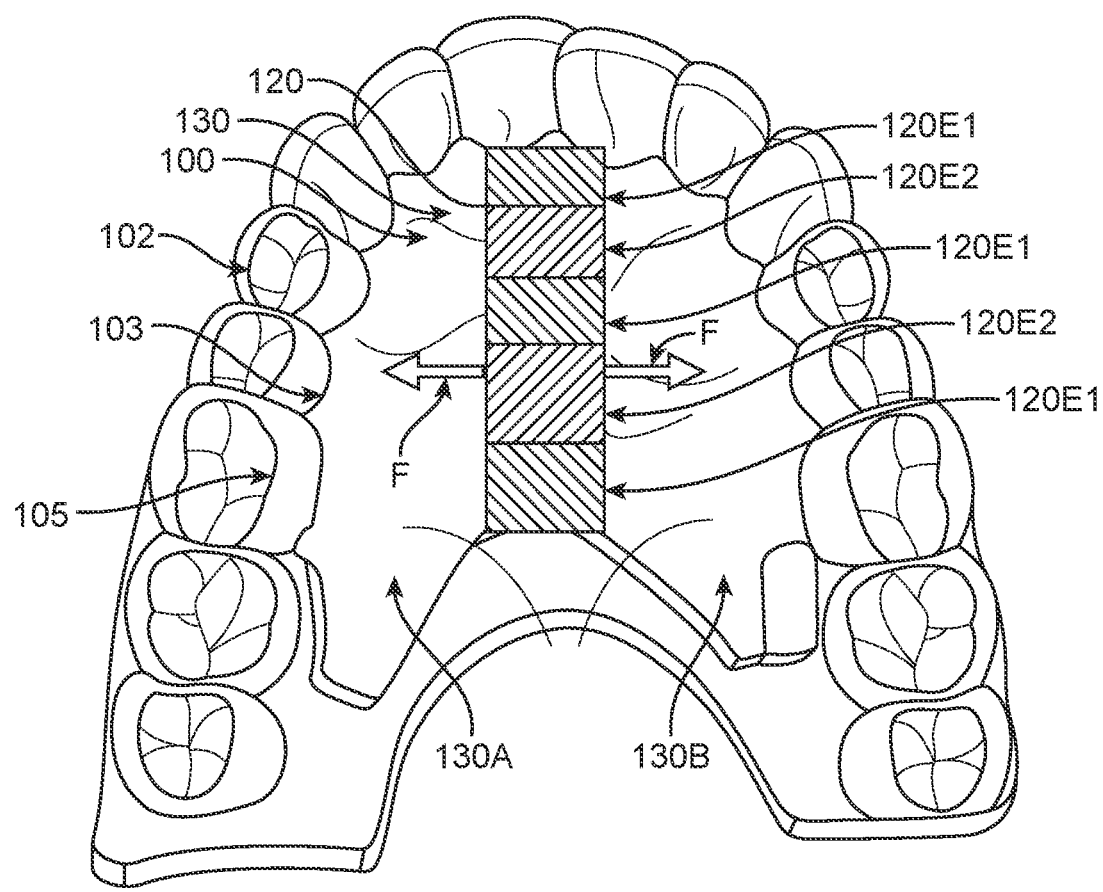
FIG. 4 shows a palatal expander comprising a force generating component comprising a plurality of expansion components configured to expand at different rates, in accordance with some embodiments.

FIG. 4 shows a force generating component 120 of an oral appliance 100 such as a palatal expander comprising a plurality of expansion components configured to expand at different rates in order to apply force. The oral appliance comprises a plurality of teeth engagement structures 103 configured to engage one or more teeth 102 on a lingual side in order to expand the palate of the patient. Optionally, the oral appliance may comprise a plurality of teeth receiving cavities 105. The passive component 130 may comprise the teeth plurality of engaging structures 103 and the plurality of teeth receiving cavities 105, for example.

In some embodiments, the passive component 130 comprises a first portion 130A and a second portion 130B. The first portion 130A can be located on a first side of the oral appliance 100 to engage first one or more teeth 102 on the first side of the mouth. The second portion 130B can be located on a second side of the mouth to engage one or more teeth 102 on the second side of the mouth. In some embodiments, the force generating component 130 is located between the first portion 130A and the second portion 130B, although the force generating component may be located at other positions as described herein. In some embodiments, the force generating component 130 comprises a plurality of components extending between the first passive component and the second passive component in order to generate opposing forces 140 (shown with arrows) to expand the palate.

The force generating component 120 can be configured in many ways as described herein. For example, the force generating component 120 can be configured to expand or extend in response to a temperature of the mouth, and to shrink or retract in response to a cooler temperature. In some embodiments, the force generating 120 component comprises a first force generating component 120E1 and a second force generating component 120E2, in which the first component and the second component are configured to extend in response to different stimuli, or to extend at different rates in response to substantially the same stimulus. In some embodiments, the first force generating component is configured to extend in response to an environment of the mouth at a first rate and the second force generating component is configured to respond to the mouth environment and extend at a second rate. For example, the first component can be configured to expand at the first rate in order to retain the appliance 100 with a first force, and the second component can be configured to expand at the second rate, in which the second rate is less than the first rate in order to expand the palate with a second force greater than the first force.

While the plurality of force generating components and be arranged in many ways, in some embodiments, each of the plurality of force generating components extend laterally from the first portion 130A to the second portion 130B of the passive component 130. For example, the first component 120E1 and the second component 120E2 can each extend between the first portion 130A and the second portion 130B. In some embodiments, the first component and the second component extend in a substantially parallel configuration. In some embodiments, the first force generating component 120E1 comprises a plurality of first force generating components, and the second force generating component 120E1 comprises a second plurality of force generating components.

Figure 5:
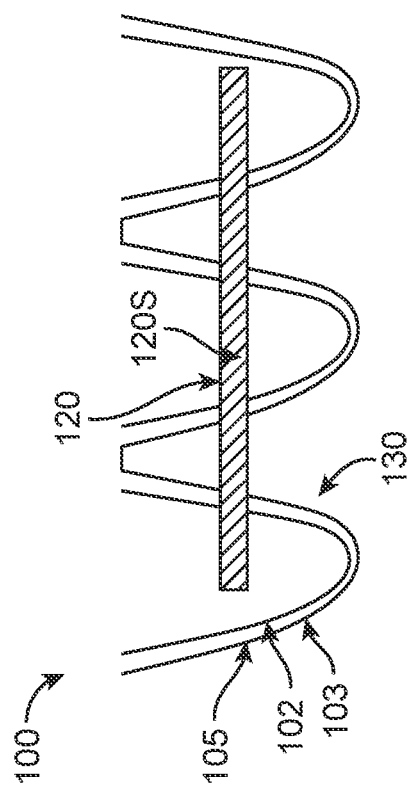
FIG. 5 shows an oral appliance comprising a force generating component configured to shrink and close an interproximal space between a plurality of teeth, in accordance with some embodiments.

FIG. 5 shows an oral appliance 100, in which the force generating component 120 comprises a force generating component 120S configured to shrink and close an interproximal space between a plurality of teeth. The force generating component 120S may extend so as to close a gap between a plurality of teeth. The force generating component 120S can be configured to shrink in response to a stimulus as described herein. In some embodiments, the force generating component 120S extends is located on appliance 100 so as to couple two non-adjacent teeth to each other. For example, the plurality of teeth may comprise a first tooth, a second tooth and a third tooth, in which the second tooth is located between the first and third teeth. The force generating component 120S can extend along appliance 100 from a first location corresponding to a first tooth receiving cavity sized and shaped to receive the first tooth to a third location corresponding to a third tooth receiving cavity sized and shaped to receive the third tooth. In such embodiments, the force generating component 120S may extend along a lingual or buccal portion of the appliance proximate the second tooth receiving cavity. In some embodiments, the force generating component is located along a lingual side of appliance 100 in order to decrease visibility of force generating component 120S.

Figure 6:
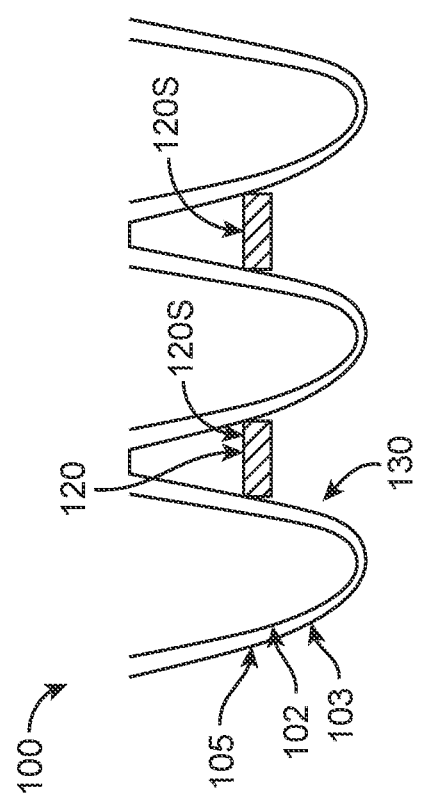
FIG. 6 shows an oral appliance comprising a force generating component configured to fit in an interproximal space, in accordance with some embodiments.

FIG. 6 shows an oral appliance comprising a force generating component 120 comprising a shrinking component 120S configured to fit in an interproximal space and draw the teeth toward each other so as to decrease an interproximal gap of the teeth. The force generating component 120S can be located on appliance 100 so as to extend in an interproximal space between a first tooth and a second tooth. In some embodiments, the force generating component 120S is located on appliance 100 so as to extend in an interproximal space between a second tooth and a third tooth.

FIGS. 7A and 7B show a force generating component 120 configured to one or more of expand or extend with a component 120E. The force generating component 120E may comprise a material configured to extend or expand in response to a stimulus as described herein. In some embodiments, the force generating component 120E is configured to extend from a first length 120L1 to a second length 120L2 in response to the stimulus, in which 120L2 is longer than 120L1. In some embodiments, the force generating component 120E is configured to expand along a second dimension, such as a width. For example, the force generating component 120E can be configured to expand from a first width 120W1 to a second width 120W2 in response to the stimulus, in which the second width 120W2 is greater than the first width 120W1.

The force generating component 120E can be configured to one or more of extend or expand in one or more of many ways as described herein. For example, the force generating component 120E may comprise one or more of a material configured to expand upon exposure to water, a material configured to expand with a controlled rate of diffusion of water into the material, a less than fully hydrated hydrogel, a hydrogel with a controlled rated of expansion in response to water, a shape memory material with transition glass temperature below a temperature of the mouth, or a material configured to expand in response to an osmotic strength of the mouth, a material configured to undergo a conformational molecular change in response to the mouth environment, a compressed resilient material coupled to an attenuation material configured to weaken, or a stimulus of a cleaning solution, for example.

FIGS. 7C and 7D show a force generating component 120 comprising a component 120S configured to shrink. The force generating component 120S may comprise a material configured to retract or shrink in response to a stimulus as described herein. In some embodiments, the force generating component 120S is configured to shrink or retract from a first length 120L1 to a second length 120L2 in response to the stimulus, in which 120L2 is shorter than 120L1. In some embodiments, the force generating component 120S is configured to shrink along a second dimension, such as a width. For example, the force generating component 120S can be configured to shrink from a first width 120W1 to a second width 120W2 in response to the stimulus, in which the second width 120W2 is less than the first width 120W1.

The force generating component 120S can be configured to one or more of retract or shrink in one or more of many ways as described herein. For example, the force generating component 120S may comprise one or more of a material configured to shrink in response to a temperature of a mouth, a polymer configured to release water in response to the temperature of the mouth, a shape memory material with transition glass temperature below a temperature of the mouth, a material configured to shrink in response to an ionic strength of the mouth, a tensioned resilient material coupled to an attenuation material configured to weaken, or a stimulus of a cleaning solution, for example.

FIGS. 7E to 7G show a force generating component 120, in which the force generating component 120 comprises a force generating component 120R configured to reversibly change one or more of length or force. In some embodiments, the change in the dimensions of length or width of the force generating component is at least partially reversible in response to a second stimulus. In some embodiments, the first stimulus and the second stimulus comprise similar stimuli, e.g. different temperatures. Alternatively or in combination, the first stimulus and the second stimulus may comprise substantially different stimuli, such as the first stimulus comprising a change in temperature and the second stimulus comprising a molecular stimulus such as calcium. Work in relation to the present disclosure suggests that the at least partially reversible change in length of the force generating component can decrease forces of the appliance in order to facilitate removal of the appliance upon exposure to the second stimulus, in accordance with some embodiments.

In some embodiments, the component 120R is configured to expand or extend in response to a first stimulus, and to retract or shrink in response to the second stimulus. In some embodiments, the force generating component 120R is configured to extend from a first length 120L1 to a second length 120L2 in response to the first stimulus, in which L2 is longer than 120L1. In some embodiments, the force generating component 120R is configured to expand along a second dimension, such as a width. For example, the force generating component 120E can be configured to expand from a first width 120W1 to a second width 120W2 in response to the first stimulus, in which the second width 120W2 is greater than the first width 120W1.

FIG. 7G shows at least partial shrinking or retraction of the component 120R in response to the second stimulus. In some embodiments, the force generating component 120R is configured to shrink or retract from a second length 120L2 to a third length 120L3 in response to the second stimulus, in which third length 120L3 is shorter than second length 120L2. In some embodiments, the force generating component 120R is configured to shrink or retract along a second dimension, such as a width. For example, the force generating component 120R can be configured to shrink from a second width 120W2 to a third width 120W3 in response to the second stimulus, in which the third width 120W3 is less than the second width 120W2.

FIGS. 8A and 8B show a force generating component comprising a first component 122 configured to extend and generate force on a tooth and a second component configured 124 to attenuate the first component 122. In some embodiments, the second component 124 is configured to weaken in response a stimulus. The first component 122 may comprise a resilient structure, such as spring, fiber, mesh, coil or other appropriate spring like structure. The second component 124 may comprise a stiff material configured to attenuate movement of the first component 122. The second component 124 is configured to weaken in response to the stimulus in order to allow the first component extend and apply the force to the tooth. The second component 124 may comprise any suitable material that weakens in response to the stimulus, such as one or more of an erodible material, a dissolvable material, a hydratable material, or a material with a transition glass temperature between about 25 degrees C. and about 37 degrees C. Because the second component 124 is configured to weaken in response to the stimulus, the second component 124 attenuates the force from component 122 less after being exposed to the stimulus, so as to allow the component 122 to deliver additional force to the tooth. As shown in FIG. 8A, in an initial configuration prior to exposure to the stimulus, e.g. placement in the mouth of the patient, the component 120E comprises first length 120L1 capable of generating a first force. Subsequent to exposure to the stimulus as shown in FIG. 8B, the component 120E comprises a second length 120L2, capable of generating a second force. Although reference is made to the length of the component 120E changing in response to the stimulus, one of ordinary skill in the art will appreciate that the weakening of the second component 124 will allow the first component 122 to deliver additional force without changing the length of the first component 122, in accordance with some embodiments.

FIGS. 8C and 8D show a force generating component comprising a first component configured to retract to generate a force on a tooth and a second component configured to weaken in response a stimulus. The first component 122 may comprise a resilient component, such as a tensioned spring, for example. As shown in FIG. 8C, in an initial configuration prior to exposure to the stimulus, e.g. placement in the mouth of the patient, the component 120E comprises first length 120L1 capable of generating a first force. Subsequent to exposure to the stimulus and weakening of second component 124 as shown in FIG. 8D, the component 120E comprises a second length 120L2, capable of generating a second force greater than the first force.

FIG. 9A shows placement of a force generating component 122 on a partially fabricated appliance 200. The partially fabricated appliance 200 may comprise a partially fabricated appliance manufactured with an additive manufacturing process as described herein. For example, the additive manufacturing process may be paused in order to place the first force generating component 122 on the appliance. The first force generating component 122 can be placed on the partially fabricated appliance with tension or compression to a suitable length such as 120L1. The partially fabricated appliance 200 may comprise one or more anchors 210 or other structures configured to retain the force generating component 122 in a compressed or tensioned configuration prior to depositing additional material. Additional material is added to fabricate the appliance, such as the second component 124 configured to attenuate the first component 124. Alternatively or in combination, additional material such as material for passive component 130 can be added in order to fabricate the appliance. In some embodiments, the additive manufacturing process adds material with layers, and layers of second component 124 may be added over the first component 122 or alongside first component 122 in order to attenuate the first component 122 with the second component 124.

While the first force generating component 122 can be placed on the partially completed appliance in many ways, in some embodiments, the first force generating component is placed with an end effector 300 of a robotic arm. For example, the end effector and robotic arm can be configured to pick up the first force generating component 122 from a first location away from partially completed appliance 200 and place the first force generating component 122 at a second location on the partially completed appliance with suitable tension or compression as described herein. In some embodiments, the end effector is configured to place the first element on the partially fabricated appliance 200 while the partially fabricated appliance remains on a build plate of a 3D printer, for example immersed in an uncured liquid material.

FIG. 9B shows the force generating component of FIG. 9A on a fully fabricated appliance prior to exposure to a stimulus, similar to the embodiments of FIG. 8A.

FIG. 9C shows the force generating component of FIG. 9B after exposure to the stimulus, similar to the embodiments of FIG. 8B.

FIG. 9D shows placement of a force generating component module 240 on a partially fabricated appliance 200. The force generating component module may comprise the first force generating component 122 and the second force generating component 124 configured to weaken in response to the stimulus. The first component 122 may comprise a tensioned or compressed configuration, the movement of which is attenuated by the second component 124 when the module 240 is placed on the partially fabricated appliance 200 with the robotic end effector 300 as described herein. Work in relation to the present disclosure suggests that the module 240 can facilitate placement on the partially fabricated appliance 200, for example without actively tensioning or compressing the component 122 while the component is being placed on the partially fabricated appliance 200. Also, the module 240 may comprise engagement structures configured to align with one or more anchors 210 or other structures of the partially fabricated appliance 240. The partially fabricated appliance 200 can be fabricated into the fully fabricated appliance 100 as described herein, for example with deposition of additional layers. The force generating component 120 can be configured to change length in response to the stimulus as described herein, for example with reference to FIGS. 9B to 9C.

FIG. 10A shows a force generating component 120 comprising a component 122 in a relaxed configuration on a partially fabricated appliance 200 prior to treatment to change molecular confirmation of the force generating component. In some embodiments, the force generating component 120 comprises the second component 124 configured to attenuate the first component 122. The first component 122 and the second component 124 can be fabricated on partially completed appliance 200 as described herein. In the relaxed configuration, the component 122 comprises an initial length 120L0.

FIG. 10B shows the force generating component 120 of FIG. 10A after treatment with a first stimulus to produce a molecular change in confirmation of the force generating component 122. The change in molecular confirmation of the component 122 can result in an elongation force or a retraction force, which is attenuated by the second component 124, such that the length 120L1 after the change in molecular confirmation is substantially similar to the initial length 120L0, e.g. to within about 5%, for example to within about 1%. The fully fabricated appliance 100 is configured for placement in the mouth with the change in molecular confirmation and the force generating component comprising the length 120L1.

The incompletely fabricated appliance 200 can be treated with the first stimulus in many ways to induce the change in molecular confirmation of the component 122 while constrained with the attenuation component 124. For example, the force generating component 122 can be exposed to ultraviolet light, acid, or ions in solution for example.

FIG. 10C shows the force generating component 120 of FIG. 10B after exposure to a second stimulus. The second stimulus weakens the second component 124 to allow component 122 to extend to a length 120L2 as described herein.

Although reference is made to changes in length of the force generating component 120 as described herein, one of ordinary skill in the art will understand that the weakening of attenuation component 124 can increase the amount of force without substantially increasing length 120L2 as compared to 120L1.

In some embodiments, the force generating component 120 as described herein comprises a plurality of force generating components, in which the plurality of force generating components is configured to change the length from L1 to L2 at different times in response to the stimulus. For example, the plurality of force generating components may comprise a plurality of first components 122 and a plurality of the second components 124, in which the plurality of second components is configured to weaken at different times with different weakening profiles in response to the stimulus, so as to provide force from each of the plurality of first components 122 at appropriate times. In some embodiments, the additional force is timed to correspond with tooth movement or with strain of the passive component 130 of the appliance, which might otherwise result in less than desirable amounts of force to the tooth.

While the first and second stimuli can be configured in many ways, in some embodiments, the first stimulus is a different type of stimulus than the second stimulus. For example, the first stimulus may comprise a stimulus applied to the appliance prior to placing the appliance in the mouth, for example a stimulus associated with a fabrication process, such as light, molecular ions, or heat. The second stimulus may comprise a stimulus associated with a mouth of the patient, such as one or more of hydration or temperature.

Figure 11:
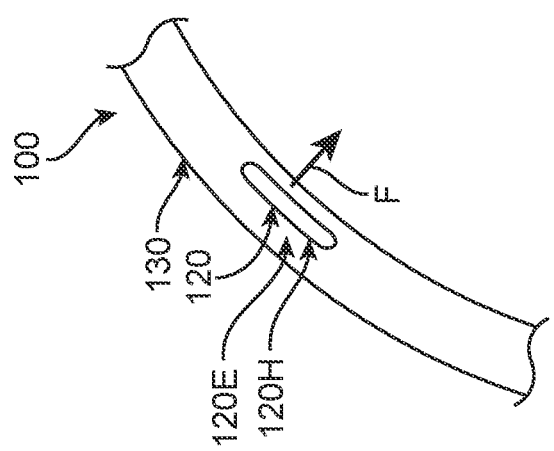
FIG. 11 shows an oral appliance comprising a force generating component comprising a hygroscopic material embedded in a passive portion of the appliance, in accordance with some embodiments.

FIG. 11 shows an oral appliance comprising a force generating component 120 comprising material configured to expand, such as a hygroscopic material 120H, embedded in a passive portion of the appliance. Although reference is made to a hygroscopic material, the material embedded in the appliance may comprise any suitable material configured to receive water and generate force with expansion, such as a less than fully hydrated hydrogel. The hygrosopic material can be configured to expand in response to the hygroscopic material absorbing water. The expansion of the hygroscopic material can generate a force sufficient to the tooth. The passive portion 130 of the appliance may extend around the hygroscopic material 120H so as to enclose the hygroscopic material within the appliance.

The rate of diffusion of water into the hygroscopic material 120H can be controlled based on material properties and dimensions of the passive portion 130 of the appliance so as to provide an appropriate rate of accumulation of water in the hygroscopic material and corresponding expansion of the hygroscopic material 120H and force to the one or more teeth from the appliance. For example, passive portion 130 of the appliance may comprise a material configured to limit the diffusion of water through the material, such as a hydrophobic polymeric material. The rate of diffusion of water into the hygroscopic material may be related to a concentration gradient of water from an exterior of the passive portion 130 to the hygroscopic material. Because the material is hygroscopic, the concentration of water at the interface between the passive portion 130 and the hygroscopic material is substantially close to 0. The concentration of water on the exterior of the passive portion 130 may correspond to the hydration of water in saliva in the mouth of the patient. In some embodiments, the rate of diffusion of water into the hygroscopic material also be related to the surface area of the hygroscopic material.

In some embodiments, the size and location of the hygroscopic material 120H within the passive material 130 can be configured to control a rate of diffusion of water into the hygroscopic material and corresponding increase in size and force to the tooth from the force generating component 120E. While the hydroscopic material 120H can be located within the passive portion of the appliance in many ways, in some embodiments, the hygroscopic material is located closer to an interior surface of the appliance shaped to receive and engage a tooth than to an exterior surface of the appliance located on an exterior side of the appliance away from the tooth receiving surface. The thickness of the passive portion 130 on the side toward the tooth can be substantially less (e.g. 50% or less) than the thickness of the passive portion 130 toward the exterior surface, such that the diffusion of water into the hygroscopic material is substantially related to the thickness of material between the hygroscopic material on the tooth facing surface. In such embodiments, the concentration gradient of water is substantially related to the thickness of material between the hygroscopic material 130 and the tooth facing surface of the appliance, and this thickness can be dimensioned to control the rate of diffusion into the appliance and the corresponding expansion of the hygroscopic material and increase in force of the force generating component 120.

Although reference is made to dimensions to control the rate of diffusion of water into the hygroscopic material, the passive component 130 may comprise a different material configured to allow water to diffuse at a different rate. For example, the passive component 130 may comprise a first polymer with a first rate of diffusion and a second polymer with a second rate of diffusion faster than the first rate of diffusion in order to control the rate of diffusion with the second polymer material. Alternatively or in combination, passive component 130 may comprise channels or pores to allow water to diffuse into the hydroscopic material at a controlled rate of diffusion.

Figure 12:
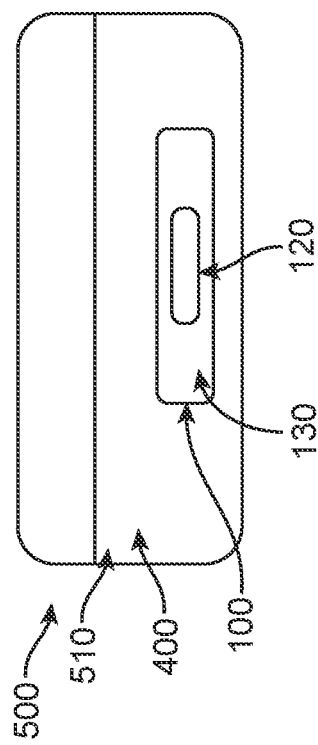
FIG. 12 shows an apparatus to treat an oral appliance with an agent to provide a conformational change of the force generating component of the appliance, in accordance with some embodiments.

FIG. 12 shows an apparatus 500 to treat an oral appliance 100 with an agent 400 to provide a conformational change of the force generating component of the appliance. The apparatus 500 may comprise a container 510 sized and shaped to receive appliance 100. In some embodiments, the apparatus 500 is configured to clean the appliance, for example with a cleaning solution.

The agent 400 may comprise any suitable agent as described herein, such as an agent configured to generate the conformational change of the molecular structure of the force generating component 120. The container may comprise a timer and circuitry configured to control one or more of a duration or an intensity of the agent 400 delivered to appliance 100. The apparatus 500 can be configured to adjust the force generating component 120 as appropriate. For example, the apparatus 500 may comprise a light source configured to illuminate the appliance to change the molecular structure of the force generating component as described herein. Alternatively or in combination, the apparatus 500 may comprise circuitry to provide electrical energy to the appliance to adjust the force generating component 120, for example, with electronic contraction or expansion of the force generating components of the appliance as described herein.

In some embodiments, the container 510 is configured to receive a solution configured to effect the conformational change to the force generating component. For example, the appliance may comprise a polymer bound ionm,f such as calcium, configured to provide a conformational change to the appliance as described herein. A solution with an appropriate pH such as vinegar can be placed in the container, and the appliance soaked in the solution for an appropriate time.

Figure 13:
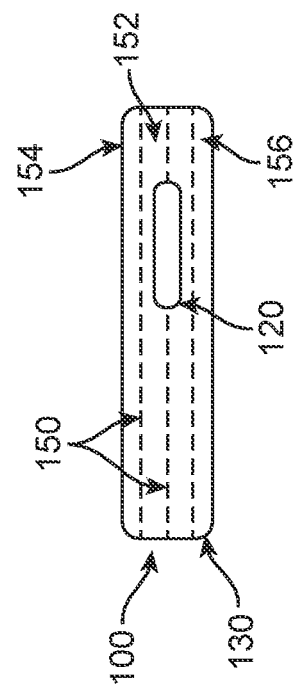
FIG. 13 shows an oral appliance comprising a plurality of layers extending through a force generating component and a passive component, in accordance with some embodiments.

FIG. 13 shows an oral appliance 100 comprising a plurality of layers 150. The plurality of layers may be present on the appliance in association with an additive manufacturing process such as 3D printing as described herein. One or more layers 152 of the plurality of layers extending through the force generating component 120 and the passive component 130. The one or more layers 152 extending through active component 120 and the passive component 130 may comprise a first passive material of the passive component 130 and a second active material of the force generating component 120. During the 3D fabrication of the appliance, each layer of the appliance can be cured on a previously cured component of the appliance, and the additive manufacturing machine configured to provide the first and second materials on a layer of the appliance. The force generating component may comprise an attenuation component 134 in addition to a force generating component 132, and these can be applied to the partially fabricated appliance 200 on the layer, e.g. the same layer, such that the one or more layers 152 comprises the material of the passive component 130, the material of the force generating component 132 and the material of the force attenuating component 134, each of which comprises a different material.

In some embodiments, the plurality of layers 150 comprises one or more layers 154 of the passive component 130 extending on a first side of the appliance so as not to extend through the force generating component 120. Alternatively or in combination, the plurality of layers 150 comprises one or more layers 156 of the passive component 130 extending on a second side of the appliance so as not to extend through the force generating component 120. In some embodiments, the first one or more layers 154 extends on the first side of the force generating component 120 and the second one or more layers 156 extends along the second side of the force generating component 120 so as to substantially encapsulate the force generating component with the passive component 130.

Figure 14:
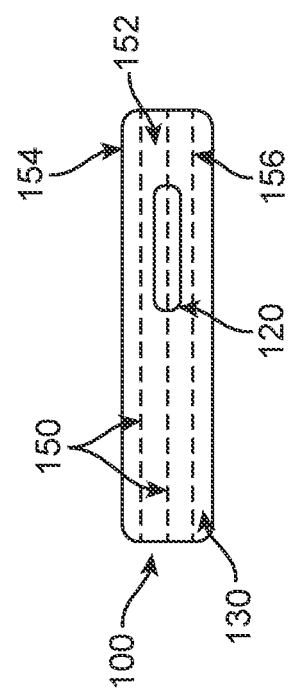
FIG. 14 shows an oral appliance comprising a plurality layers extending around a force generating component without extending through the force generating component.

FIG. 14 shows an oral appliance 100 comprising a plurality layers 150 extending around a force generating component 120 without extending through the force generating component. In some embodiments, the force generating component 120 has been placed on a partially fabricated appliance 200 as described herein. The plurality of layers 150 may comprise one or more layers 152 of passive component 130 extending substantially around a perimeter the force generating component without extending through the force generating component. The plurality of layers 150 may comprise one or more the plurality of layers 154 or the plurality of layers 156 described herein with reference to FIG. 13, for example.

Direct Fabrication of 4D Force Generating Components with 3D Printing

The appliance 100 can be fabricated in many ways, for example with 3D printing as described herein.

The force generating component 120 can be configured in many ways to provide force to the one or more teeth as described herein.

In some embodiments, the force generating component 120 is configured to change the amount of force in response to a change in molecular confirmation. In some embodiments, the force generating component comprises crosslinks, and breaking the crosslinks can increase the amount of force. In some embodiments, the force generating component comprises a polymer configured to expand or contract in response to an amount of a chelating agent. Increasing the amount of chelating agent increases contraction of the polymer, and decreasing the amount of chelating agent decreases contraction of the polymer. For example, the force generating component may comprise a spiropyran, which comprises an open configuration until a chelating agent is present and generates a closed configuration which decreases a length of the polymer.

In some embodiments, the force generating component 120 comprises an electronically activated material configured to expand or contract in response to an electric field.

In some embodiments, the force generating component 120 and/or 122 comprises a photo dimer capable changing isomers to vary the strength of the attenuation component. In some embodiments, the photo dimer is capable of selective switching between cis and trans isomers, such as azobenzene. For example, light greater than 400 nm can be used to switch the cis isomer to the trans isomer, and light less than 400 nm can be used to switch trans isomer to the cis isomer.

In some embodiments, the force generating component 120 comprises an attenuation component 124 configured to weaken as described herein. The attenuation component 124 may comprise a material configured to weaken in the present of water, such as material configured to one or more of erode or dissolve in the presence of water. The erodible material may comprise an erodible polymer or copolymer, such as an erodible poly lactic acid (PLA), an erodible poly glycolic acid (PGA), a copolymer of PLA and PGA, a polyamide, polyester, or a copolymer of any of the forgoing. In some embodiments, the erodible component comprises an ester group configured to undergo hydrolysis, such as time dependent hydrolysis in response to an environment of the mouth.

In some embodiments, the attention component 124 comprises calcium. In some embodiments, the attenuation component comprises polymer comprising a carboxylic acid group, which is coupled to a calcium ion in a stiff configuration. Upon exposure to a material with a sufficiently low pH, the calcium ion is displaced and the polymer allowed to move more freely and decrease the stiffness and corresponding attenuation. In some embodiments, the attenuation component 124 comprises an anhydrite such as calcium sulfate, configured to erode in the presence of a solution with an appropriately low pH.

In some embodiments, the attenuation component 124 comprises a crosslinked polymer to add stiffness to the polymer, in which the crosslinks can be broken to weaken the attenuation polymer increase the amount of force to the tooth. In some embodiments, the crosslinks of the attenuation component 124 can be preferentially broken in response to light such as ultraviolet light, by providing suitable functional groups on the polymer.

While many 3D printing materials can be used to fabricate one or more components of the force generating component 120, in some embodiments, the force generating component 120 comprises a polymer with a suitable transition glass (Tg) temperature. The transition glass temperature may comprise a temperature within a range from about 20 degrees C. to about 35 degrees C., for example within a range from about 25 degrees C. to about 35 degrees C.

In some embodiments, the force generating component comprises a shape memory material configured to return to an initial shape in response to the stimulus. In some embodiments, the stimulus comprises a temperature such as a TG temperature. For example, the force generating component may comprise an initial shape above the TG temperature, and compressed or extended above the TG temperature and then cooled below the TG temperature, so as to allow the force generating component to return to the initial shape in response the stimulus temperature above TG.

The transition glass temperature can be combined with the force generating component in many ways. In some embodiments, the force generating component comprises a shape memory material configured to return to a memory shape when placed in the mouth of the patient, for example with a transition glass temperature within a range from about 25 degrees C. to about 35 degrees C. Alternatively or in combination, the force generating component may comprise the attenuation component 124, in which the attention component 124 comprises a transition glass temperature within a range from about 25 degrees C. to about 35 degrees C., so as to weaken and release the force from the first force generating component 122 as described herein.

Examples of suitable materials with a transition glass temperature include an interpenetrating polymer network ("IPN"). The interpenetrating network may comprise alginate and poly(N-isopropylacrylamide), for example. The force generating component 120 may comprise a 4D structure fabricated by printing a layer of this active component on the same layer as other materials of other components such as passive components as described herein.

In some embodiments, the force generating component 120 is configured to shrink and comprises a thermally responsive covalent crosslinked network of poly(N-isopropylacrylamide) configured to provide actuation through reversible volume transitions. In some embodiments, the poly(N-isopropylacrylamide) comprises a temperature sensitive hydrogel configured to provide a reversible volume transition at a critical temperature ("Tc"), which can be within a range from about 32 degrees C. to about 35 degrees, C for example. The volume change is related to coil to globule transition of the IPN polymer network strands, which decreases the amount of water when the temperature increases above Tc. The decrease in water can provide shrinkage of the force generating component 120 as described herein, for example.

In some embodiments, the force generating component 120 comprises poly(N-isopropylacrylatnide) configured to respond to one or more of pH, ions such as calcium, or a voltage.

Direct Fabrication of 4D Oral Appliances

The various embodiments of the orthodontic appliances presented herein can be fabricated in a wide variety of ways to manufacture a 4D appliance. In some embodiments, the orthodontic appliances herein (or portions thereof) can be produced using direct fabrication, such as additive manufacturing techniques (also referred to herein as "3D printing)

or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, two or more materials with different properties are used to fabricate the appliance with 3D printing. The first material comprising the substantially passive material and the second material comprising the material configured to respond to the stimulus as described herein can be fabricated with 3D additive manufacturing. Examples of materials and 3D printing technology suitable for incorporation in accordance with embodiments of the present disclosure are described in US Pat. Pub. No. 2015/0158244, entitled "Object, Of Additive Manufacture With Encoded Predicted Shape Change And Method Of Manufacturing Same", the entire disclosure of which is incorporated herein by reference. The Connex Object line of 3D printers commercially available from Stratasys are well suited for printing 4D appliances in accordance with the present disclosure.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although various embodiments herein are described with respect to direct fabrication techniques, it shall be appreciated that other techniques can also be used, such as indirect fabrication techniques. In some embodiments, the appliances herein (or portions thereof) can be produced using indirect fabrication techniques, such as by thermoforming over a positive or negative mold. Indirect fabrication of an orthodontic appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields, buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

Digital Design of Orthodontic Appliances

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, and 4D printing, etc.). The computer-based methods presented herein can improve the accuracy, flexibility, and convenience of appliance fabrication.

In some embodiments, computer-based 3-dimensional planning/design tools, such as Treat™ software from Align Technology, Inc., may be used to design and fabricate the orthodontic appliances described herein.

Figure 15:
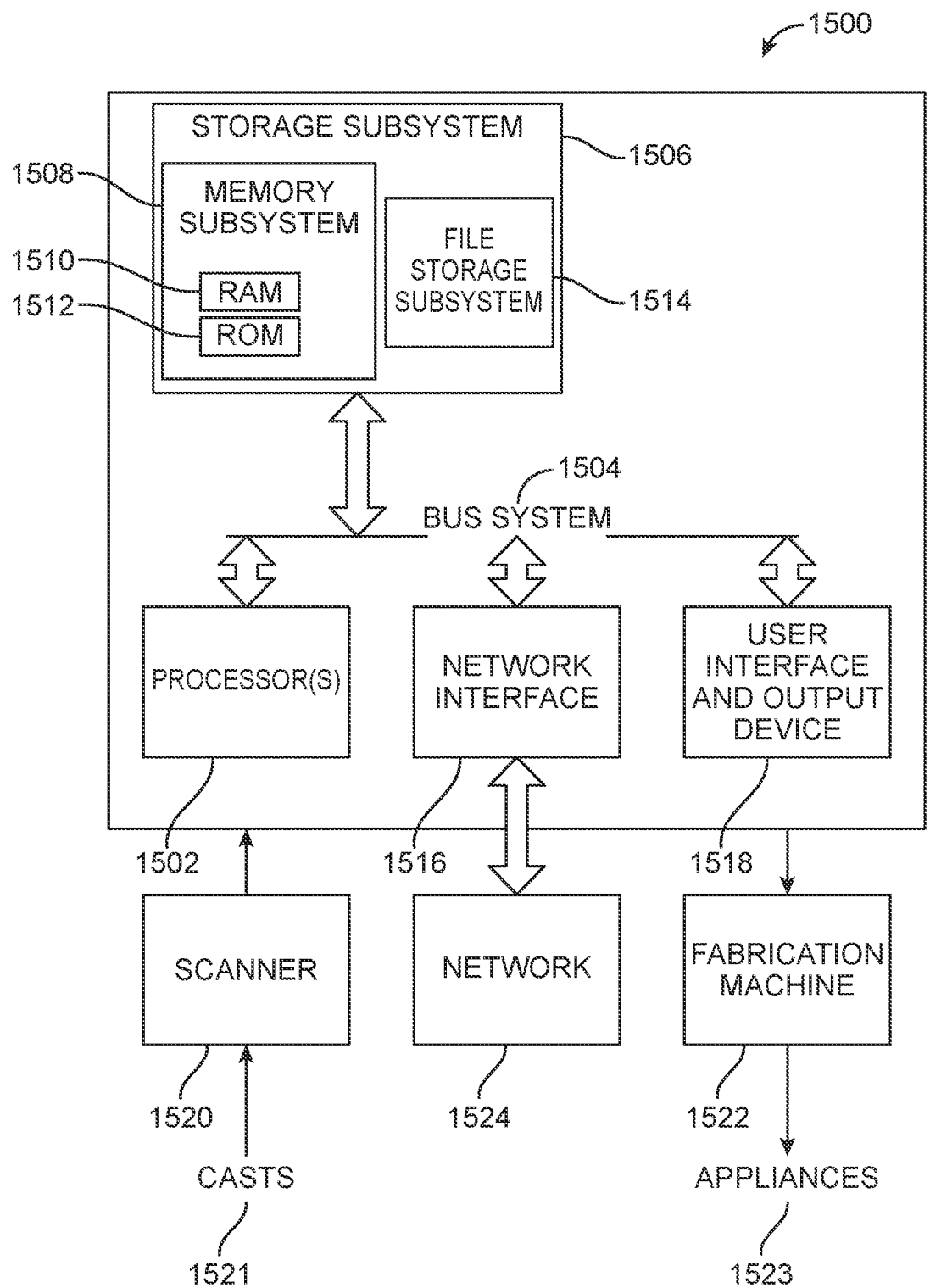
FIG. 15 show a simplified block diagram of a data processing system, in accordance with embodiments.

FIG. 15 shows a simplified block diagram of a data processing system 1500 that may be used in executing methods and processes described herein. The data processing system 1500 typically includes at least one processor 1502 that communicates with one or more peripheral devices via bus subsystem 1504. These peripheral devices typically include a storage subsystem 1506 (memory subsystem 1508 and file storage subsystem 1514), a set of user interface input and output devices 1518, and an interface to outside networks 1516. This interface is shown schematically as "Network Interface" block 1516, and is coupled to corresponding interface devices in other data processing systems via communication network interface 1524. Data processing system 1500 can include, for example, one or more computers, such as a personal computer, workstation, mainframe, laptop, and the like.

The user interface input devices 1518 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1506 maintains the basic required programming, including computer readable media having instructions (e.g., operating instructions, etc.), and data constructs. The program modules discussed herein are typically stored in storage subsystem 1506. Storage subsystem 1506 typically includes memory subsystem 1508 and file storage subsystem 1514. Memory subsystem 1508 typically includes a number of memories (e.g., RAM 1510, ROM 1512, etc.) including computer readable memory for storage of fixed instructions, instructions and data during program execution, basic input/output system, etc. File storage subsystem 1514 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 1520 includes any means for obtaining a digital representation (e.g., images, surface topography data, etc.) of a patient's teeth (e.g., by scanning physical models of the teeth such as casts 1521, by scanning impressions taken of the teeth, or by directly scanning the intraoral cavity), which can be obtained either from the patient or from treating professional, such as an orthodontist, and includes means of providing the digital representation to data processing system 1500 for further processing. Scanner 1520 may be located at a location remote with respect to other components of the system and can communicate image data and/or information to data processing system 1500, for example, via a network interface 1524. Fabrication system 1522 fabricates appliances 1523 based on a treatment plan, including data set information received from data processing system 1500. Fabrication machine 1522 can, for example, be located at a remote location and receive data set information from data processing system 1500 via network interface 1524.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments, one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. An oral appliance for repositioning teeth of a patient, the oral appliance comprising: a plurality of teeth engaging structures shaped to engage the teeth of the patient; a force generating component coupled to the plurality of teeth engaging structures, the force generating component is configured to generate a force in response to a stimulus in order to reposition one or more teeth of the patient.

Clause 2. The appliance of clause 1, wherein the force generating component comprises a push-pull component.

Clause 3. The appliance of clause 2, wherein the push-pull component is configured to engage an attachment on a tooth to push the attachment in a first direction and pull the attachment from a second direction.

Clause 4. The appliance of clause 2, wherein the push-pull component comprises a push component configured to extend and a pull component configured to retract.

Clause 5. The appliance of clause 2, wherein the push-pull component comprises a push component configured to push the one or more teeth from a first position toward a second position and a pull component configured to pull the one or more teeth from the first position toward the second position.

Clause 6. The appliance of clause 2, wherein the push-pull component comprises a push component configured to push a first portion of the appliance toward the one or more teeth and a pull component configured to pull a second portion of the appliance away from one or more teeth in order to move the one or more teeth from a first position toward a second position.

Clause 7. The appliance of clause 1, wherein the force generating component is configured to compensate for a stress relaxation of a portion of the appliance by increasing the force over time.

Clause 8. The appliance of clause 7, wherein the force generating component is configured to increase the force in coordination with an increase in the stress relaxation of the portion of the appliance.

Clause 9. The appliance of clause 7, wherein the force generating component is configured to increase the force by no more than 50% over a week.

Clause 10. The appliance of clause 1, wherein the force generating component comprises a first component to generate the force to the one or more teeth and a second component configured to decrease the first force, the second component configured to weaken in response to the stimulus in order to increase the force.

Clause 11. The appliance of clause 10, wherein the first component comprises a resilient flexible component embedded within the second component, the second component comprising a stiff material to retain the resilient flexible component in a first configuration prior to exposure to the stimulus and wherein the stiff material is configured to weaken in response to the stimulus in order to allow the resilient flexible component to apply the force to one or more teeth with a second configuration.

Clause 12. The appliance of clause 11, wherein the resilient flexible component comprises one or more of a compressed spring, tensioned spring, a fiber, a shape memory material, a compressed material, a tensioned material, or a material with a transition glass temperature between about 20 degrees C. and 37 degrees C.

Clause 13. The appliance of clause 11, wherein the resilient flexible component comprises a fiber embedded in a cured material, and the cured material is configured to weaken in response to the stimulus.

Clause 14. The appliance of clause 11, wherein the second component comprises a fiber configured to weaken in response to the stimulus.

Clause 15. The appliance of clause 10, wherein the first component comprises one or more of a hydratable material, a hygroscopic material, a shape memory material, a material with a transition glass temperature, a polymeric material, a photo activatable dimer material, a photo activatable cross-linked material, a chemically activatable material, a calcium activatable material, a calcium activatable cross-linked material, a pH activatable material, or an electrically activatable material.

Clause 16. The appliance of clause 10, wherein the second component comprises one or more of an erodible material, a dissolvable material, a hydratable material, or a photo activatable dimer.

Clause 17. The appliance of clause 10, the appliance comprises a plurality of layers deposited with an additive manufacturing process extending at least partially around the first component and the second component without extending through the first component and the second component.

Clause 18. The appliance of clause 1, further comprising a displaceable component configured to weaken in response to the stimulus and allow movement of the one or more teeth in response to the force from the force generating component.

Clause 19. The appliance of clause 18, wherein the appliance comprises a pocket to receive an attachment on a tooth, and wherein the force generating component is located on the appliance to apply the force to the attachment from a first side of the attachment and the displaceable component is located on a second side of the attachment in order to be displaced with movement of the attachment toward the displaceable component in response to the force from the force generating component.

Clause 20. The appliance of clause 18, wherein the displaceable component comprises one or more of an erodible material or a dissolvable material configured to erode or dissolve in response to the stimulus.

Clause 21. The appliance of clause 1, wherein the appliance comprises structure from a 3D additive manufacturing process and the force generating component comprises the structure.

Clause 22. The appliance of clause 18, wherein the structure comprises a plurality of layers and the force generating component comprises the plurality of layers.

Clause 23. The appliance of clause 1, wherein the appliance has been fabricated from a 3D additive manufacturing process and the plurality of teeth engaging structures and the force generating component have been fabricated together with the 3D additive manufacturing process.

Clause 24. The appliance of clause 1, wherein the stimulus comprises one or more of light, heat, a mouth temperature, hydration, pH, salinity, osmotic strength, an ion of a solution, or electricity.

Clause 25. The appliance of clause 1, wherein the appliance comprises a palatal expander.

Clause 26. The appliance of clause 24, wherein the palatal expander comprises a first plurality of tooth engaging structures to engage a first plurality of teeth on a first side of an arch and second plurality of tooth engaging structures to engage a second plurality of teeth on a second side of the arch and wherein the force generating component is coupled to the first plurality of tooth engaging structures and the second plurality of tooth engaging structures in order to extend a distance between the first plurality of teeth and the second plurality of teeth and increase a size of the arch.

Clause 27. The appliance of clause 25, wherein the force generating component comprises a first component extending between the first side and the second side and a second component extending between the first side and the second side.

Clause 28. The appliance of clause 26, wherein the first component is configured to expand before the second component.

Clause 29. The appliance of clause 27, wherein the first component is configured to expand in response to heat and the second component is configured to expand in response to hydration of the mouth.

Clause 30. The appliance of clause 28, where in the first component is configured to expand from a first size at ambient temperature to a second size at a mouth temperature.

Clause 31. The appliance of clause 29, wherein the first component is configured to shrink in response to cooling of the mouth.

Clause 32. A method of treating teeth, the method comprising: placing an appliance as in any one of the preceding clauses on the teeth, wherein the appliance includes: a plurality of teeth engaging structures shaped to engage the teeth of the patient, and a force generating component coupled to the plurality of teeth engaging structures, the force generating component configured to generate a force in response to a stimulus in order to reposition one or more teeth of the patient.

Clause 33. The method of clause 32, wherein the force generation component provides a first force for a first time period and a second force for a second time period.

Clause 34. The method of clause 32, further comprising: stimulating the force generating component with a first stimulant to provide a first force; and stimulating the force generating component with a second stimulant to provide a second force.

Clause 35. The method of clause 34, wherein the first stimulant and the second stimulant are a similar stimulus.

Clause 36. The method of clause 34, wherein the first stimulant and the second stimulant are a different stimulus.

Clause 37. The method of clause 32, wherein the force generating component comprises a push-pull component.

Clause 38. The method of clause 33, wherein the push-pull component is configured to engage an attachment on a tooth to push the attachment in a first direction and pull the attachment from a second direction.

Clause 39. The method of clause 33, wherein the push-pull component comprises a push component configured to extend and a pull component configured to retract.

Clause 40. The method of clause 33, wherein the push-pull component comprises a push component configured to push the one or more teeth from a first position toward a second position and a pull component configured to pull the one or more teeth from the first position toward the second position.

Clause 41. The method of clause 33, wherein the push-pull component comprises a push component configured to push a first portion of the appliance toward the one or more teeth and a pull component configured to pull a second portion of the appliance away from one or more teeth in order to move the one or more teeth from a first position toward a second position.

Clause 42. The method of clause 32, wherein the force generating component is configured to compensate for a stress relaxation of a portion of the appliance by increasing the force over time.

Clause 43. The method of clause 38, wherein the force generating component is configured to increase the force in coordination with an increase in the stress relaxation of the portion of the appliance.

Clause 44. The method of clause 38, wherein the force generating component is configured to increase the force by no more than 50% over a week.

Clause 45. The method of clause 32, wherein the force generating component comprises a first component to generate the force to the one or more teeth and a second component configured to decrease the first force, the second component configured to weaken in response to the stimulus in order to increase the force.

Clause 46. The method of clause 41, wherein the first component comprises a resilient flexible component embedded within the second component, the second component comprising a stiff material to retain the resilient flexible component in a first configuration prior to exposure to the stimulus and wherein the stiff material is configured to weaken in response to the stimulus in order to allow the resilient flexible component to apply the force to one or more teeth with a second configuration.

Clause 47. A method of fabricating an oral appliance, the method comprising: forming a plurality of teeth engaging structures shaped to engage the teeth of the patient; and forming a force generating component coupled to the plurality of teeth engaging structures, the force generating component configured to generate a force in response to a stimulus in order to reposition one or more teeth of the patient.

Clause 48. The method of clause 47, wherein the force generating component comprises a push-pull component.

Clause 49. The method of clause 48, wherein the push-pull component is formed with a shape to engage an attachment on a tooth to push the attachment from a first direction and pull the attachment from a second direction.

Clause 50. The method of clause 48, wherein the push-pull component comprises a push component formed with a material that expands with exposure to a first stimulus and a pull component configured to shrink with exposure to the first stimulus.

Clause 51. The method of clause 48, wherein the push-pull component comprises a push component configured to push the one or more teeth from a first position toward a second position and a pull component configured to pull the one or more teeth from the first position toward the second position.

Clause 52. The method of clause 48, wherein the push-pull component comprises a push component configured to push a first portion of the appliance toward the one or more teeth and a pull component configured to pull a second portion of the appliance away from one or more teeth in order to move the one or more teeth from a first position toward a second position.

Clause 53. The method of clause 47, wherein the force generating component is configured to compensate for a stress relaxation of a portion of the appliance by increasing the force over time in response to a stimulus.

Clause 54. The method of clause 53, wherein the force generating component is configured to increase the force in coordination with an increase in the stress relaxation of the portion of the appliance.

Clause 55. The method of clause 53, wherein the force generating component is configured to increase the force by no more than 50% over a week.

Clause 56. The method of clause 47, wherein the force generating component comprises a first component to generate the force to the one or more teeth and a second component configured to decrease the first force, the second component configured to weaken in response to the stimulus in order to increase the force.

Clause 57. The method of clause 56, wherein the first component comprises a resilient flexible component embedded within the second component, the second component comprising a stiff material to retain the resilient flexible component in a first configuration prior to exposure to the stimulus and wherein the stiff material is configured to weaken in response to the stimulus in order to allow the resilient flexible component to apply the force to one or more teeth with a second configuration.

Clause 58. A method comprising: gathering a virtual model of teeth of a patient; identifying on the virtual model one or more displacements to move the teeth from a first arrangement toward a second arrangement; identifying a plurality of teeth engaging structures shaped to engage the teeth and shaped to implement a first portion of the one or more displacements; identifying one or more time-dependent structures having a first shape at a first time and a second shape at a second time, the one or more time-dependent structures configured to change from the first shape toward the second shape in response to one or more stimuli, and the one or more time-dependent structures configured to implement a second portion of the one or more displacements; designing a dental appliance for the teeth using the plurality of teeth engaging structures and the one or more time-dependent structures; and providing instructions to manufacture the dental appliance using a 3D additive manufacturing process.

Clause 59. The method of clause 58, wherein the dental appliance is one of a series of dental appliances configured to incrementally reposition the teeth from an initial arrangement toward a target arrangement.

Clause 60. The method of clause 58, further comprising: identifying one or more forces to move the teeth from the first arrangement toward the second arrangement; and using the one or more forces to identify the one or more displacements.

Clause 61. The method of clause 58, further comprising: identifying one or more treatment protocols to move the teeth from the first arrangement toward the second arrangement; and using the one or more treatment protocols to identify the one or more displacements.

Clause 62. The method of clause 58, wherein the dental appliance comprises an aligner shaped to reposition the teeth from the first arrangement toward the second arrangement.

Clause 63. The method of clause 58, wherein the dental appliance comprises an incremental palatal expander shaped to reposition a palate of the patient.

Clause 64. The method of clause 58, wherein the one or more time-dependent structures comprise any of the force generating components of claims 1-31.

Clause 65. The method of clause 58, further comprising manufacturing the dental appliance using the 3D additive manufacturing process.

Clause 66. The method of clause 58, wherein the 3D additive manufacturing process comprises a scalable industrial process for manufacturing dental appliances.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An oral appliance for repositioning teeth of a patient, the oral appliance comprising:
 a polymeric shell having a plurality of tooth receiving cavities shaped to receive the teeth of the patient; and
 a force generating component within the polymeric shell of a first of the plurality of tooth receiving cavities, the force generating component is configured to generate a force in response to a stimulus in order to reposition one or more teeth of the patient;
 wherein the appliance, the plurality of teeth engaging structures, and the force generating component comprise a sequentially polymerized plurality of layers directly fabricated together using a 3D additive manufacturing process, and
 wherein the force generating component comprises a push-pull component within the polymeric shell of the first of the plurality of tooth receiving cavities and configured to push a tooth from a first location in a first direction and pull the tooth from a second location in the first direction at the same time.

2. The appliance of claim 1, wherein the push-pull component is configured to engage an attachment on a tooth to push the attachment in the first direction from the first location and pull the attachment from the second location in the first direction.

3. The appliance of claim 1, wherein the push-pull component comprises a push component configured to extend and a pull component configured to retract.

4. The appliance of claim 1, wherein the push-pull component comprises a push component configured to push the tooth from a first position toward a second position and a pull component configured to pull the tooth from the first position toward the second position.

5. The appliance of claim 1, wherein the push-pull component comprises a push component configured to push a first portion of the appliance toward one or more teeth and a pull component configured to pull a second portion of the appliance away from the one or more teeth in order to move the tooth from a first position toward a second position.

6. The appliance of claim 1, wherein the force generating component is configured to compensate for a stress relaxation of a portion of the appliance by increasing the force over time.

7. The appliance of claim 6, wherein the force generating component is configured to increase the force in coordination with an increase in the stress relaxation of the portion of the appliance.

8. The appliance of claim 6, wherein the force generating component is configured to increase the force by no more than 50% over a week.

9. The appliance of claim 1, wherein the push-pull component comprises a first portion configured to generate the force on the tooth and wherein the push-pull component further comprises a second portion configured to decrease the force, the second portion configured to weaken in response to the stimulus in order to increase the force.

10. The appliance of claim 9, wherein the first portion comprises a resilient flexible component embedded within the second portion, the second portion comprising a stiff material to retain the resilient flexible component in a first configuration prior to exposure to the stimulus and wherein the stiff material is configured to weaken in response to the stimulus in order to allow the resilient flexible component to apply the force to one or more teeth with a second configuration.

11. The appliance of claim 10, wherein the resilient flexible component comprises one or more of a compressed spring, tensioned spring, a fiber, a shape memory material, a compressed material, a tensioned material, or a material with a transition glass temperature between about 20 degrees C. and 37 degrees C.

12. The appliance of claim 9, wherein the first portion comprises one or more of a hydratable material, a hygroscopic material, a shape memory material, a material with a transition glass temperature, a polymeric material, a photo activatable dimer material, a photo activatable cross-linked material, a chemically activatable material, a calcium activatable material, a calcium activatable cross-linked material, a pH activatable material, or an electrically activatable material.

13. The appliance of claim 9, wherein the second portion comprises one or more of an erodible material, a dissolvable material, a hydratable material, or a photo activatable dimer.

14. The appliance of claim 1, wherein the push-pull component comprises a portion configured to weaken in response to the stimulus and allow movement of the one or more teeth in response to the force from the force generating component.

15. The appliance of claim 14, wherein the appliance comprises a pocket to receive an attachment on a tooth, and wherein the force generating component is located on the appliance to apply the force to the attachment from a first side of the attachment and the portion configured to weaken is located on a second side of the attachment in order to be displaced with movement of the attachment toward the displaceable component in response to the force from the force generating component.

16. The appliance of claim 14, wherein the portion configured to weaken comprises one or more of an erodible material or a dissolvable material configured to erode or dissolve in response to the stimulus.

17. The appliance of claim 1, wherein the plurality of teeth engaging structures and the force generating component have been fabricated together with the 3D additive manufacturing process.

18. The appliance of claim 1, wherein the stimulus comprises one or more of light, heat, a mouth temperature, hydration, pH, salinity, osmotic strength, an ion of a solution, or electricity.

* * * * *